US012111587B2

(12) United States Patent
Hayakawa et al.

(10) Patent No.: US 12,111,587 B2
(45) Date of Patent: Oct. 8, 2024

(54) DEVELOPING UNIT HAVING GUIDE THAT STABLY SUPPORTS TONER CARTRIDGE

(71) Applicant: Brother Kogyo Kabushiki Kaisha, Nagoya (JP)

(72) Inventors: Masahiko Hayakawa, Ama (JP); Masashi Imai, Kasugai (JP); Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/315,682

(22) Filed: May 11, 2023

(65) Prior Publication Data

US 2023/0280676 A1 Sep. 7, 2023

Related U.S. Application Data

(63) Continuation of application No. 17/540,344, filed on Dec. 2, 2021, now Pat. No. 11,698,595, which is a (Continued)

(30) Foreign Application Priority Data

Jun. 30, 2009 (JP) ................................ 2009-156057

(51) Int. Cl.
*G03G 15/08* (2006.01)
*G03G 21/16* (2006.01)

(52) U.S. Cl.
CPC ..... *G03G 15/0889* (2013.01); *G03G 15/0844* (2013.01); *G03G 15/0865* (2013.01); (Continued)

(58) Field of Classification Search
CPC ........... G03G 15/0844; G03G 15/0865; G03G 15/0868; G03G 15/0872; G03G 15/0875; (Continued)

(56) References Cited

U.S. PATENT DOCUMENTS 5,078,303 A 1/1992 Kikuchi et al.
5,385,181 A 1/1995 Bhagwat et al.
(Continued)

FOREIGN PATENT DOCUMENTS

JP H03-196074 A 8/1991
JP H0635321 A 2/1994
(Continued)

OTHER PUBLICATIONS

JP Office Action mailed May 10, 2011, JP Appln. 2009-156057.
(Continued)

*Primary Examiner* — Hoang X Ngo
(74) *Attorney, Agent, or Firm* — Banner & Witcoff, Ltd.

(57) ABSTRACT

A developing device includes a developer cartridge and a developing unit. The developer cartridge, in some instances, may include a shutter. This shutter may have a wall for closing a developer supply hole, and be movable, with respect to a developer cartridge casing, between an open position where the supply hole is opened by the wall and a closed position where the supply hole is closed by the wall. The shutter may further include a protrusion that is movable with respect to the wall of the shutter between a first position and a second position in an axial direction. The protrusion, in the first position, is engageable with a developing unit and, in the second position, would be disengaged from the developing unit.

15 Claims, 15 Drawing Sheets

Related U.S. Application Data continuation of application No. 17/114,929, filed on Dec. 8, 2020, now Pat. No. 11,221,570, which is a continuation of application No. 16/940,971, filed on Jul. 28, 2020, now Pat. No. 10,871,731, which is a continuation of application No. 16/803,398, filed on Feb. 27, 2020, now Pat. No. 10,761,457, which is a continuation of application No. 16/257,884, filed on Jan. 25, 2019, now Pat. No. 10,599,068, which is a continuation of application No. 15/805,719, filed on Nov. 7, 2017, now Pat. No. 10,222,723, which is a continuation of application No. 15/485,722, filed on Apr. 12, 2017, now Pat. No. 9,823,602, which is a continuation of application No. 15/335,936, filed on Oct. 27, 2016, now Pat. No. 9,658,568, which is a continuation of application No. 14/950,890, filed on Nov. 24, 2015, now Pat. No. 9,483,017, which is a continuation of application No. 14/286,186, filed on May 23, 2014, now Pat. No. 9,201,340, which is a continuation of application No. 13/572,846, filed on Aug. 13, 2012, now Pat. No. 8,737,876, which is a continuation of application No. 12/731,443, filed on Mar. 25, 2010, now Pat. No. 8,254,807.

(52) U.S. Cl.
CPC ..... *G03G 15/0868* (2013.01); *G03G 15/0872* (2013.01); *G03G 15/0875* (2013.01); *G03G 15/0877* (2013.01); *G03G 15/0886* (2013.01); *G03G 15/0896* (2013.01); *G03G 21/1647* (2013.01); *G03G 21/1676* (2013.01)

(58) Field of Classification Search
CPC ........... G03G 15/0877; G03G 15/0886; G03G 15/0896; G03G 21/1647; G03G 21/1676
See application file for complete search history.

(56) References Cited

U.S. PATENT DOCUMENTS

| | | | |
|---|---|---|---|
| 5,612,770 | A | 3/1997 | Bandai et al. |
| 5,630,198 | A | 5/1997 | Makino |
| 5,722,019 | A | 2/1998 | Nakajima |
| 5,852,757 | A | 12/1998 | Tooda et al. |
| 6,185,401 | B1 | 2/2001 | Kanamori et al. |
| 6,292,644 | B1 | 9/2001 | Goto et al. |
| 6,438,345 | B1 | 8/2002 | Ban et al. |
| 6,496,671 | B2 | 12/2002 | Nakajima |
| 6,608,980 | B2 | 8/2003 | Murayama et al. |
| 7,010,250 | B1 | 3/2006 | Yahagi |
| 7,412,188 | B2 | 8/2008 | Ishii et al. |
| 7,412,192 | B2 | 8/2008 | Nakajima et al. |
| 7,522,866 | B2 | 4/2009 | Deguchi et al. |
| 7,634,218 | B2 | 12/2009 | Sato |
| 7,672,621 | B2 | 3/2010 | Sato |
| 7,706,699 | B2 | 4/2010 | Taguchi et al. |
| 7,711,294 | B2 | 5/2010 | Mase |
| 7,747,192 | B2 | 6/2010 | Sato |
| 7,761,039 | B2 | 7/2010 | Nishimura et al. |
| 7,907,875 | B2 | 3/2011 | Sato |
| 7,925,191 | B2 | 4/2011 | Sato |
| 7,991,333 | B2 | 8/2011 | Sato |
| 8,023,864 | B2 | 9/2011 | Takagi et al. |
| 8,126,372 | B2 | 2/2012 | Saito et al. |
| 8,554,116 | B2 | 10/2013 | Sato |
| 8,626,035 | B2 | 1/2014 | Ozawa et al. |
| 8,750,753 | B2 | 6/2014 | Itabashi |
| 9,201,340 | B2 | 12/2015 | Hayakawa et al. |
| 9,829,827 | B2 | 11/2017 | Arai et al. |
| 2005/0158071 | A1 | 7/2005 | Hosokawa et al. |
| 2006/0257163 | A1 | 11/2006 | Sato |
| 2007/0065184 | A1 | 3/2007 | Sato |
| 2007/0189811 | A1 | 8/2007 | Sato |
| 2007/0196136 | A1 | 8/2007 | Yamamoto et al. |
| 2008/0080899 | A1 | 4/2008 | Mase |
| 2008/0212997 | A1 | 9/2008 | Sato |
| 2008/0213008 | A1 | 9/2008 | Sato |
| 2008/0247793 | A1* | 10/2008 | Sato .................. G03G 15/6502 399/388 |
| 2008/0267669 | A1 | 10/2008 | Kim et al. |
| 2009/0087224 | A1 | 4/2009 | Sakuma |
| 2009/0129823 | A1 | 5/2009 | Koshimori et al. |
| 2010/0054819 | A1 | 3/2010 | Sato |
| 2010/0329734 | A1 | 12/2010 | Hayakawa et al. |
| 2010/0329746 | A1 | 12/2010 | Sato |

FOREIGN PATENT DOCUMENTS

| | | | |
|---|---|---|---|
| JP | 06-161244 | A | 6/1994 |
| JP | 09-062074 | A | 3/1997 |
| JP | 2000-162861 | A | 6/2000 |
| JP | 2001-083792 | A | 3/2001 |
| JP | 2002-091153 | A | 3/2002 |
| JP | 2004-233492 | A | 8/2004 |
| JP | 2005-189423 | A | 7/2005 |
| JP | 2006-343359 | A | 12/2006 |
| JP | 2007-086322 | A | 4/2007 |
| JP | 2007-212966 | A | 8/2007 |
| JP | 2007-219417 | A | 8/2007 |
| JP | 2008-083516 | A | 4/2008 |
| JP | 2008-216453 | A | 9/2008 |
| JP | 2008-275888 | A | 11/2008 |

OTHER PUBLICATIONS

JP Office Action mailed May 24, 2011, JP Appln. 2009-156058.

JP Office Action mailed Mar. 13, 2012, JP Appln. 2009-156057.

CN Office Action mailed Feb. 29, 2012, CN Appln. 201010145566.5.

Office Action issued in Chinese Patent Application No. 201010145566.5 mailed Nov. 21, 2012.

Notice of Allowance issued in corresponding U.S. Appl. No. 12/731,409 mailed Jun. 6, 2013.

Decision of Rejection issued in corresponding Chinese Patent Application No. 201010145566.5 on Jun. 7, 2013.

Oct. 7, 2014—(US) Non-Final Office Action—U.S. Appl. No. 14/044,652.

Apr. 23, 2015—(US) Notice of Allowance—U.S. Appl. No. 14/044,652.

Nov. 10, 2015—(US)—Non-Final Office Action—U.S. Appl. No. 14/835,386.

* cited by examiner

DEVELOPING UNIT HAVING GUIDE THAT STABLY SUPPORTS TONER CARTRIDGE

CROSS REFERENCE TO RELATED APPLICATION

This application is a continuation of prior U.S. application Ser. No. 17/540,344 filed Dec. 2, 2021, which is a continuation of prior U.S. application Ser. No. 17/114,929 filed Dec. 8, 2020, issued on Jan. 11, 2022 as U.S. Pat. No. 11,221,570, which is a continuation of prior U.S. application Ser. No. 16/940,971 filed Jul. 28, 2020, issued on Dec. 22, 2020 as U.S. Pat. No. 10,871,731, which is a continuation of prior U.S. application Ser. No. 16/803,398 filed Feb. 27, 2020, issued on Sep. 1, 2020 as U.S. Pat. No. 10,761,457 which is a continuation of prior U.S. application Ser. No. 16/257,884, filed Jan. 25, 2019, issued on Mar. 24, 2020 as U.S. Pat. No. 10,599,068 which is a continuation of prior U.S. application Ser. No. 15/805,719, filed Nov. 7, 2017, issued on Mar. 5, 2019 as U.S. Pat. No. 10,222,723, which is a continuation of prior U.S. application Ser. No. 15/485,722, filed Apr. 12, 2017, issued on Nov. 21, 2017 as U.S. Pat. No. 9,823,602, which is a continuation of prior U.S. application Ser. No. 15/335,936 filed on Oct. 27, 2016, issued on May 23, 2017 as U.S. Pat. No. 9,658,568, which is a continuation of prior U.S. application Ser. No. 14/950,890 filed on Nov. 24, 2015, issued on Nov. 1, 2016 as U.S. Pat. No. 9,483,017, which is a continuation of prior U.S. application Ser. No. 14/286,186, filed May 23, 2014, and issued on Dec. 1, 2015 as U.S. Pat. No. 9,201,340, which is a continuation of prior U.S. application Ser. No. 13/572,846, filed Aug. 13, 2012, which issued on May 27, 2014 as U.S. Pat. No. 8,737,876, which is a continuation application of prior U.S. application Ser. No. 12/731,443, filed Mar. 25, 2010, which issued Aug. 28, 2012 as U.S. Pat. No. 8,254,807, which claims priority from Japanese Patent Application No. 2009-156057 filed Jun. 30, 2009. The entire contents of these priority applications are incorporated herein by reference.

TECHNICAL FIELD

The present invention relates to a developing device used in an image forming device and a developer cartridge detachably attachable to the developing device.

BACKGROUND

There has been known a developing unit including a developing housing and a toner cartridge freely detachably mounted on the developing housing. In one type of developing unit, toner is supplied through a toner outlet formed in the toner cartridge into the developing housing through a toner inlet formed therein. The toner cartridge has a shutter that selectively opens and closes the toner outlet, and the developing housing has another shutter that selectively opens and closes the toner inlet.

When the toner cartridge is mounted onto the developing housing, the shutter of the toner cartridge engages with an engaging member formed on the developing housing, and the shutter of the developing housing engages with an engaging member formed on the toner cartridge. In this condition, a user grips a part of the toner cartridge furthest from the toner outlet and then pivots the toner cartridge in a predetermined direction about a side nearest the toner outlet. This pivoting movement opens the both shutters at once. On the other hand, pivoting the toner cartridge in an opposite direction closes the both shutters at once, enabling the user to remove the toner cartridge from the developing housing.

That is, in the above-described developing unit, pivoting the toner cartridge for mounting the toner cartridge onto or removing the toner cartridge from the developing housing also opens or closes the both shutters.

SUMMARY

Because the toner cartridge is pivoted when mounting the toner cartridge onto or removing the toner cartridge from the developing housing, the posture of the toner cartridge becomes highly likely unstable. However, the developing unit is not provided with a configuration for stabilizing the posture of the toner cartridge during and after the attachment/detachment of the toner cartridge. Thus, there are dangers that a user cannot smoothly attach or detach the toner cartridge to or from the developing housing, and that the toner cartridge mounted on the developing housing is accidentally detached from the developing housing.

In view of the foregoing, it is an object of the invention to provide a developer cartridge that is pivoted when attached to or detached from a developing unit, that can be smoothly attached to or detached from the developing unit, and that is prevented from accidentally being detached from the developing unit. It is another object of the invention to provide a developer device including the developer cartridge.

In order to attain the above and other objects, the invention provides a developing device including a developer cartridge that accommodates a developer and a developing unit to which the developer cartridge is detachably attached. The developing unit includes a developing frame, a developer bearing member supported to the developing frame and being configured to bear the developer, a first guide fixed to the developing frame, and a second guide supported to the developing frame so as to be movable with respect to the developing frame between a first position where the second guide is in continuous with the first guide and a second position where a continuous state of the second guide with the first guide is interrupted. The developer cartridge includes a developer frame that accommodates the developer and a first guided member supported to the developer frame so as to be movable with respect to the developer frame. The first guide and the second guide at the first position guide the first guided member of the developer cartridge in the course of attaching the developer cartridge to or detaching the developer cartridge from the developing unit. When an attachment of the developer cartridge to the developing unit completes, the first guide receives the first guided member, and the second guide is at the second position.

According to another aspect, the present invention provides a developer cartridge detachably attachable to a body of one of an image forming device and a developing device that is detachably mounted on the image forming device. The developer cartridge includes a developer frame that accommodates a developer and a first guided member that is movably supported to the developer frame and that is guided by a guide formed on the body in the course of attaching the developer cartridge to or detaching the developer cartridge from the body.

The present invention further provides a developer cartridge including a casing accommodating a developer and formed with an opening, a shutter that is configured to move between a first position to close the opening and a second position to open the opening, a first protrusion protruding from an outer surface of the casing and extending in a predetermined direction, and a pair of second protrusions protruding from the outer surface of the casing at positions interposing the first protrusion therebetween and capable of moving relative to the first protrusion. The pair of second protrusions aligns with each other in the predetermined direction when the shutter is at the first position and aligns with each other in a direction intersecting the predetermined direction when the shutter is at the second position.

BRIEF DESCRIPTION OF THE DRAWINGS

The particular features and advantages of the invention as well as other objects will become apparent from the following description taken in connection with the accompanying drawings, in which:

FIG. 2(*b*) is a left side view of the developing section with the receiving part at the second position;

FIG. 2(*c*) is a cross-sectional left side view of the developing section with the receiving part at a first position;

FIG. 2(*d*) is a left side view of the developing section with the receiving part at the first position:

FIG. 3(*b*) is a cross-sectional left side view of the toner cartridge with the inner casing at the closed position;

FIG. 3(*c*) is a right side view of the toner cartridge with the inner casing at the closed position;

FIG. 3(*d*) is a left side view of the toner cartridge with the inner casing at an open position;

FIG. 3(*e*) is a cross-sectional left side view of the toner cartridge with the inner casing at the open position;

FIG. 3(*f*) is a right side view of the toner cartridge with the inner casing at the open position;

FIG. 4(*b*) is a cross-sectional view taken along a line IVb-IVb of FIG. 3(*e*);

FIG. 5(*b*) is a cross-sectional left side view of the process cartridge of FIG. 5(*a*);

FIG. 5(*c*) is a partially-cross-sectional left side view of the process cartridge with the receiving part at the second position with the drum section omitted;

FIG. 5(*d*) is a cross-sectional left side view of the process cartridge of FIG. 5(*c*);

FIG. 8(*b*) is a cross-sectional left side view of the toner cartridge with the retaining member mounted thereon;

FIG. 8(*c*) is a right side view of the toner cartridge with the retaining member mounted thereon;

FIG. 9(*b*) is a cross-sectional left side view of the process cartridge with the receiving part at the second position.

DETAILED DESCRIPTION

An image forming device according to an embodiment of the invention will be described while referring to the accompanying drawings. This embodiment pertains to a printer 1 shown in FIG. 1.

The terms "upward," "downward," "upper," "lower," "above," "below," "beneath," "right," "left," "front," "rear" and the like will be used throughout the description assuming that the printer 1 is disposed in an orientation in which it is intended to be used.

Figure 1:
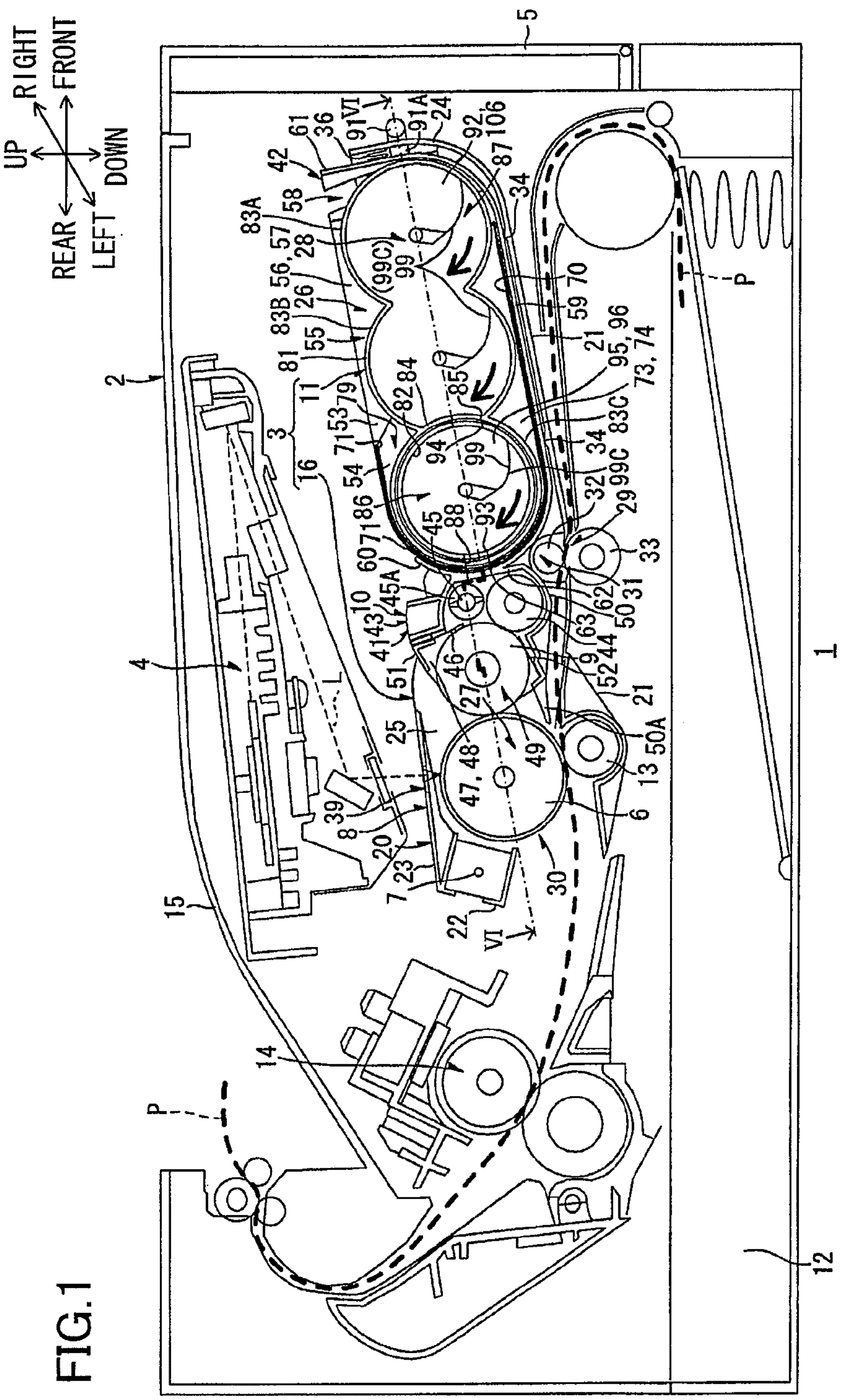
FIG. 1 is a cross-sectional left side view of a printer according to an embodiment of the present invention.
Figure 2A:
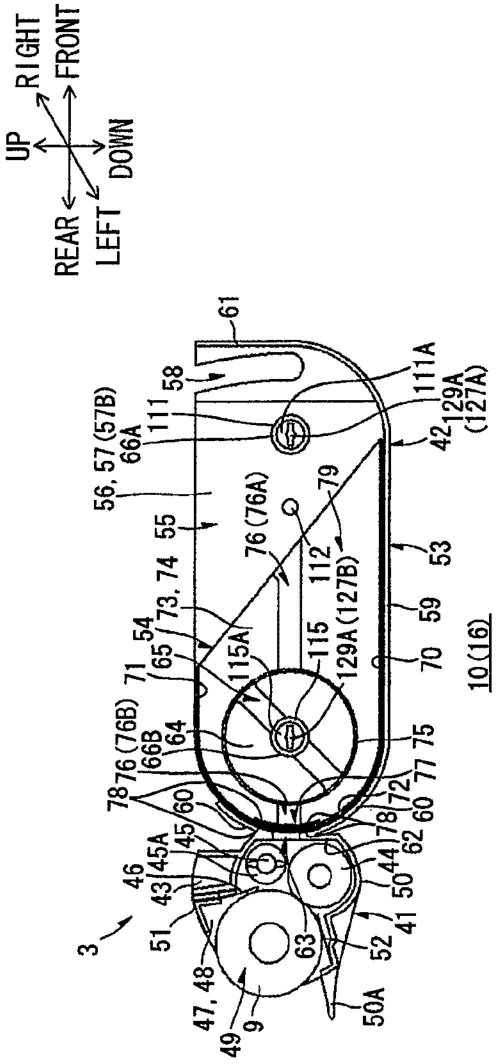
FIG. 2(*a*) is a cross-sectional left side view of a developing section of a developing unit of the printer of FIG. 1 with a receiving part at a second position.
Figure 2B:
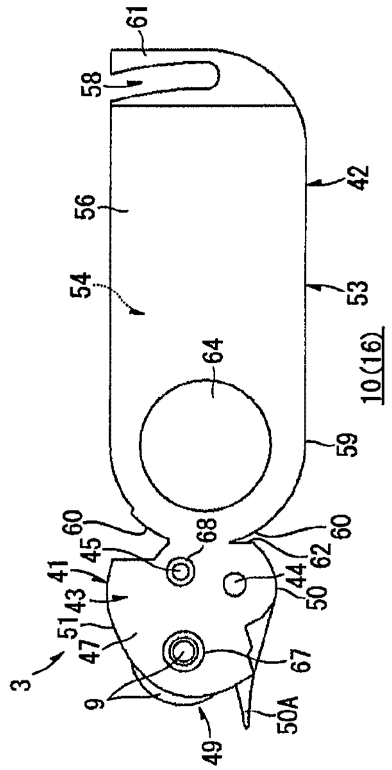
Figure 2C:
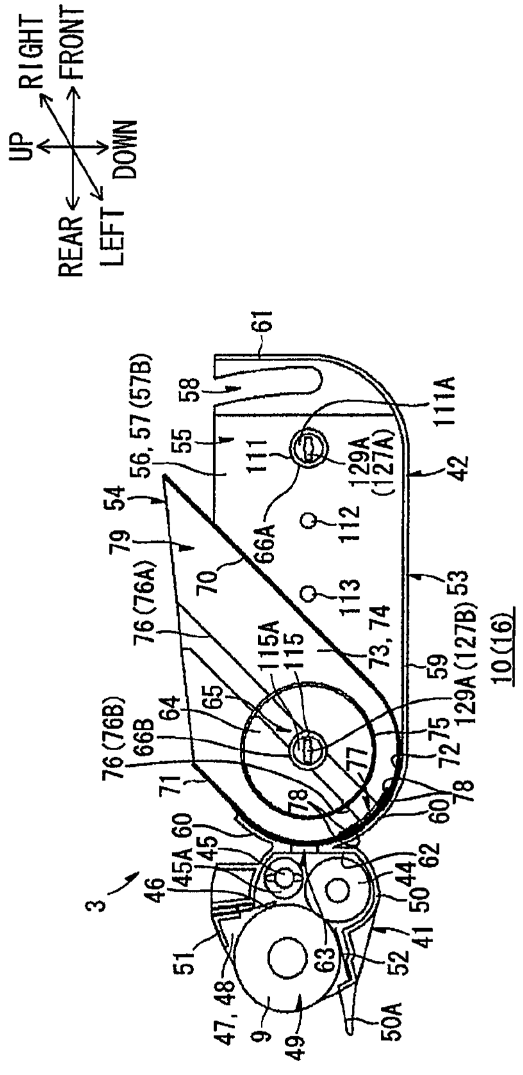
Figure 2D:
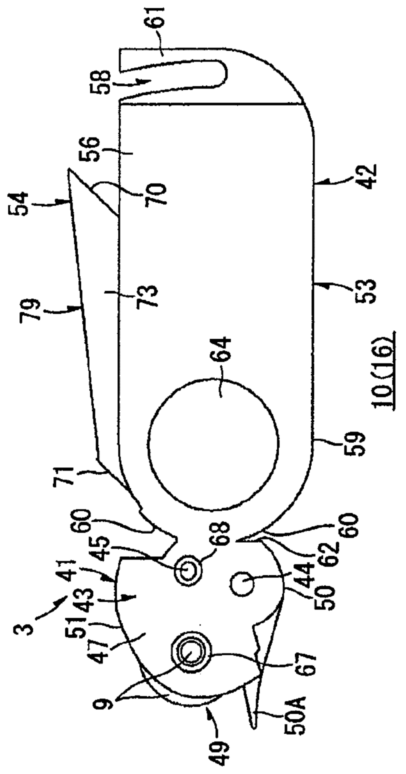
Figure 3A:
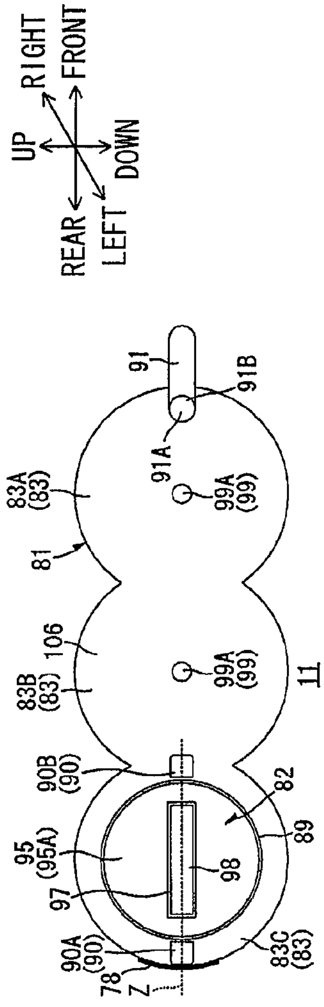
FIG. 3(*a*) is a left side view of a toner cartridge of the printer of FIG. 1 with an inner casing at a closed position.
Figure 3B:
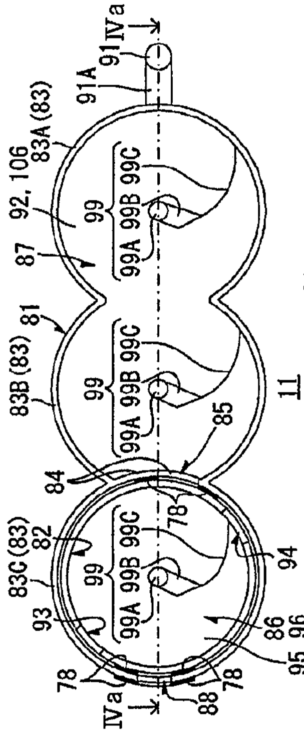
Figure 3C:
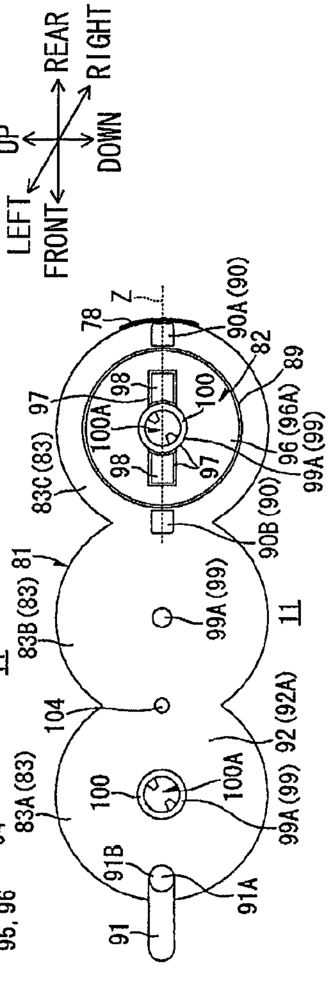
Figures 3D, 3E, 3F:
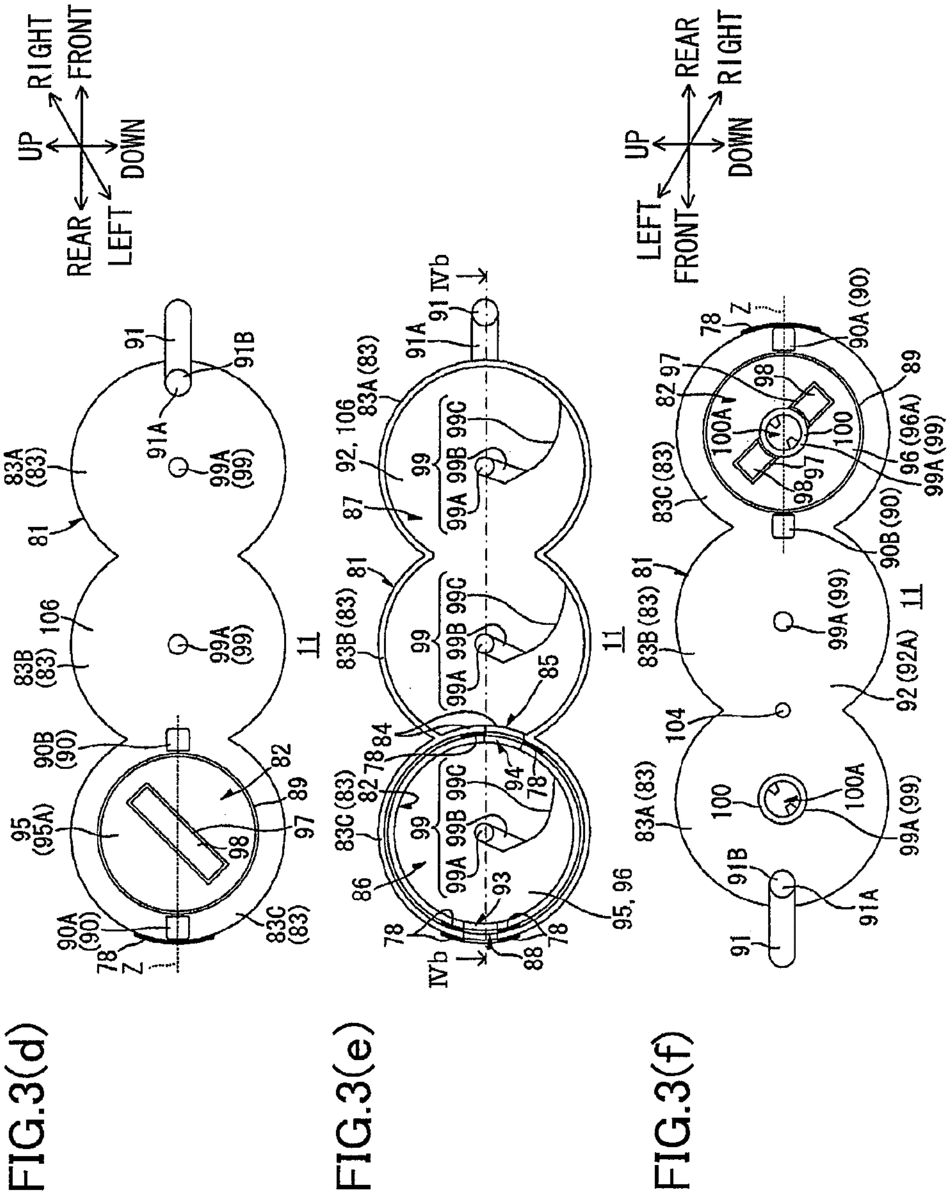

As shown in FIG. 1, the printer 1 includes a main casing 2, a process cartridge 3 (serving as a developing device) disposed in a midsection of the main casing 2, and an exposing unit 4 disposed above the process cartridge 3 within the main casing 2. The exposing unit 4 includes a laser unit (not shown).

The main casing 2 has a front cover 5 that is pivotable about its lower end so as to selectively open and close. Opening the front cover 5 exposes the process cartridge 3, enabling a user to remove the process cartridge 3 from the main casing 2 from the front side.

The process cartridge 3 includes a toner cartridge 11 (serving as a developer cartridge) and a developing unit 16. The toner cartridge 11 accommodates toner as developer and is detachably mounted on the developing unit 16. The developing unit 16 has a drum section 8 and a developing section 10. The drum section 8 supports a photosensitive drum 6, a Scorotron charger 7, and a transfer roller 13. The developing section 10 supports a developing roller 9 (developer bearing member) having an outer peripheral surface for carrying toner supplied from the toner cartridge 11.

The developing section 10 is supported to the drum section 8 such that part of the outer peripheral surface of the developing roller 9 is pressed against an outer peripheral surface of the photosensitive drum 6.

During image forming operations, the Scorotron charger 7 uniformly charges the outer peripheral surface of the photosensitive drum 6 as the photosensitive drum 6 rotates. Then, the outer peripheral surface of the photosensitive drum 6 is selectively exposed by a laser beam L emitted from the exposing unit 4. As a result, an electrostatic latent image corresponding to image data is formed on the outer peripheral surface of the photosensitive drum 6. When the electrostatic latent image comes into confrontation with the developing roller 9, the toner carried on the developing roller 9 is selectively supplied to the electrostatic latent image on the photosensitive drum 6 because of the potential difference between the electrostatic latent image and the developing roller 9. As a result, the electrostatic latent image is transformed into a visible toner image. In this manner, the toner image is formed on the photosensitive drum 6.

The printer 1 also includes a sheet-supply cassette 12, a transfer roller 13, and a fixing unit 14. The sheet-supply cassette 12 is disposed in the bottom section of the main casing 2. The sheet-supply cassette 12 accommodates a stack of recording paper P which is supplied one at a time to a transfer position between the photosensitive drum 6 and the transfer roller 13 disposed in confrontation with the photosensitive drum 6. The toner image formed on the photosensitive drum 6 is transferred onto the recording paper P at the transfer position when the toner image comes into confrontation with the transfer roller 13 with the recording paper P interposed therebetween.

The fixing unit 14 is disposed on a downstream side of the process cartridge 3 in a paper conveying direction in which the recording paper P is conveyed. The recording paper P with the toner image transferred thereon is conveyed to the fixing unit 14. The fixing unit 14 fixes the toner image onto the recording paper P by heat and pressure. The recording paper P with the toner image fixed thereon in this manner is subsequently discharged onto a discharge tray 15 formed on top of the main casing 2 by various rollers.

Note that although the process cartridge 3 mounted on the main casing 2 is slightly slanting upward toward the front as shown in FIG. 1, in the following description it is assumed that the process cartridge 3 is disposed in the horizontal direction without tilt for explanation purpose unless mentioned otherwise. Next, the drum section 8 of the developing unit 16 will be described in detail.

The drum section 8 includes a drum case 20, the photosensitive drum 6, the Scorotron charger 7, and the transfer roller 13.

The drum case 20 is in a hollow box shape elongated in a width direction (right-and-left direction) and flattened in a vertical direction (up-and-down direction), and has a bottom wall 21, a rear wall 22, an upper wall 23, a front wall 24, and a pair of side walls 25 (only one is shown in FIG. 1), all integrally formed with one another.

Each side wall 25 is in a plate shape thin in the width direction and long in a front-to-rear direction. The side walls 25 are disposed in confrontation with each other with a space therebetween. The bottom wall 21 spans between bottom edges of the side walls 25 and elongated in the front-to-rear direction. The upper wall 23 is disposed over approximately a rear one-thirds of the bottom wall 21 with a space therebetween. The rear wall 22 spans in the vertical direction between rear edges of the upper wall 23 and the bottom wall 21. The front wall 24 extends curving upward from a front edge of the bottom wall 21 and spans between front edges of the side walls 25.

With this configuration, approximately a rear one-thirds of the top of the drum case 20 is occupied by the upper wall 23 described above, and approximately a front two-thirds is an opening 26 through which an internal space of the drum case 20 is exposed to the upper side. The opening 26 is defined by a front edge of the upper wall 23, an upper edge of the front wall 24, and part of upper edges of the side walls 25 on the front side of the upper wall 23. The toner cartridge 11 is attached to and detached from the developing unit 16 through the opening 26.

A rear part of the internal space of the drum case 20 (the drum section 8) functions as a drum accommodating chamber 27 and a front part thereof functions as a developing-section accommodating chamber 28. More specifically, the drum accommodating chamber 27 is a part of the internal space of the drum case 20 defined in the vertical direction between the upper wall 23 and an approximately a rear one-thirds of the bottom wall 21, and the developing-section accommodating chamber 28 is a part located on the front side of the drum accommodating chamber 27. The drum accommodating chamber 27 and the developing-section accommodating chamber 28 are in communication with each other.

The photosensitive drum 6 and the transfer roller 13 are disposed within the drum accommodating chamber 27 with their center axes extending in the width direction. The transfer roller 13 contacts the bottom of the photosensitive drum 6. Lateral ends of each of the photosensitive drum 6 and the transfer roller 13 are rotatably supported to the pair of side walls 25. When viewed along the width direction, the portion of the bottom wall 21 confronting the bottom peripheral surface of the transfer roller 13 is curved in an arc shape that is convex on the bottom so as to follow the lower peripheral surface of the transfer roller 13.

The front surface of the rear wall 22 confronts the interior of the drum-accommodating chamber 27 from the rear side thereof. The Scorotron charger 7 is mounted on the upper end of the rear wall 22 on the front surface thereof and opposes the rear outer peripheral surface of the photosensitive drum 6, with a prescribed gap formed therebetween. A through-hole 39 is formed in a portion of the top wall 23 opposing the top of the photosensitive drum 6. The laser beam L emitted from the exposing unit 4 passes through the through-hole 39 and strikes the outer peripheral surface of the photosensitive drum 6.

A front-to-rear dimension of the developing-section accommodating chamber 28 is two to three times that of the drum accommodating chamber 27. The developing-section accommodating chamber 28 is in direct communication with the opening 26 and is exposed upward through the opening 26. An inlet 29 is formed in the rear end of the bottom wall 21 in a region defining the bottom of the developing-section accommodating chamber 28. The inlet 29 penetrates the bottom wall 21 vertically and is elongated in the width direction.

During the image forming operations, the recording paper P enters the drum section 8 through the inlet 29 and passes through the transfer position between the photosensitive drum 6 and the transfer roller 13. The rear wall 22 is formed with an outlet 30 that penetrates the rear wall 22 in the front-to-rear direction and that is elongated in the width direction. After passing through the transfer position, the recording paper P passes through the outlet 30 and is conveyed to the fixing unit 14.

The bottom surface of the bottom wall 21 in the region adjacent to the inlet 29 is formed as a recessed part having an arc shape when viewed along the width direction, with the convex side facing upward. This recessed part is a roller-accommodating part 31. A roller 32 extending in the width direction is accommodated in the lower side of the roller-accommodating part 31. A center axis of the roller 32 extends in the width direction, and lateral ends thereof are rotatably supported to the pair of side walls 25. In a condition where the process cartridge 3 is mounted on the main casing 2 as shown in FIG. 1, the roller 32 confronts the upper part of a roller 33 disposed within the main casing 2. The rollers 32 and 33 function as registration rollers that control the transfer timing of the recording paper P.

A plurality of protrusions 34 protrude upward from an upper surface of the bottom wall 21 (the surface confronting the developer-section accommodating chamber 28) in a region frontward of both the inlet 29 and the roller-accommodating part 31. The protrusions 34 are aligned in the front-to-rear direction at predetermined intervals.

Figure 6:
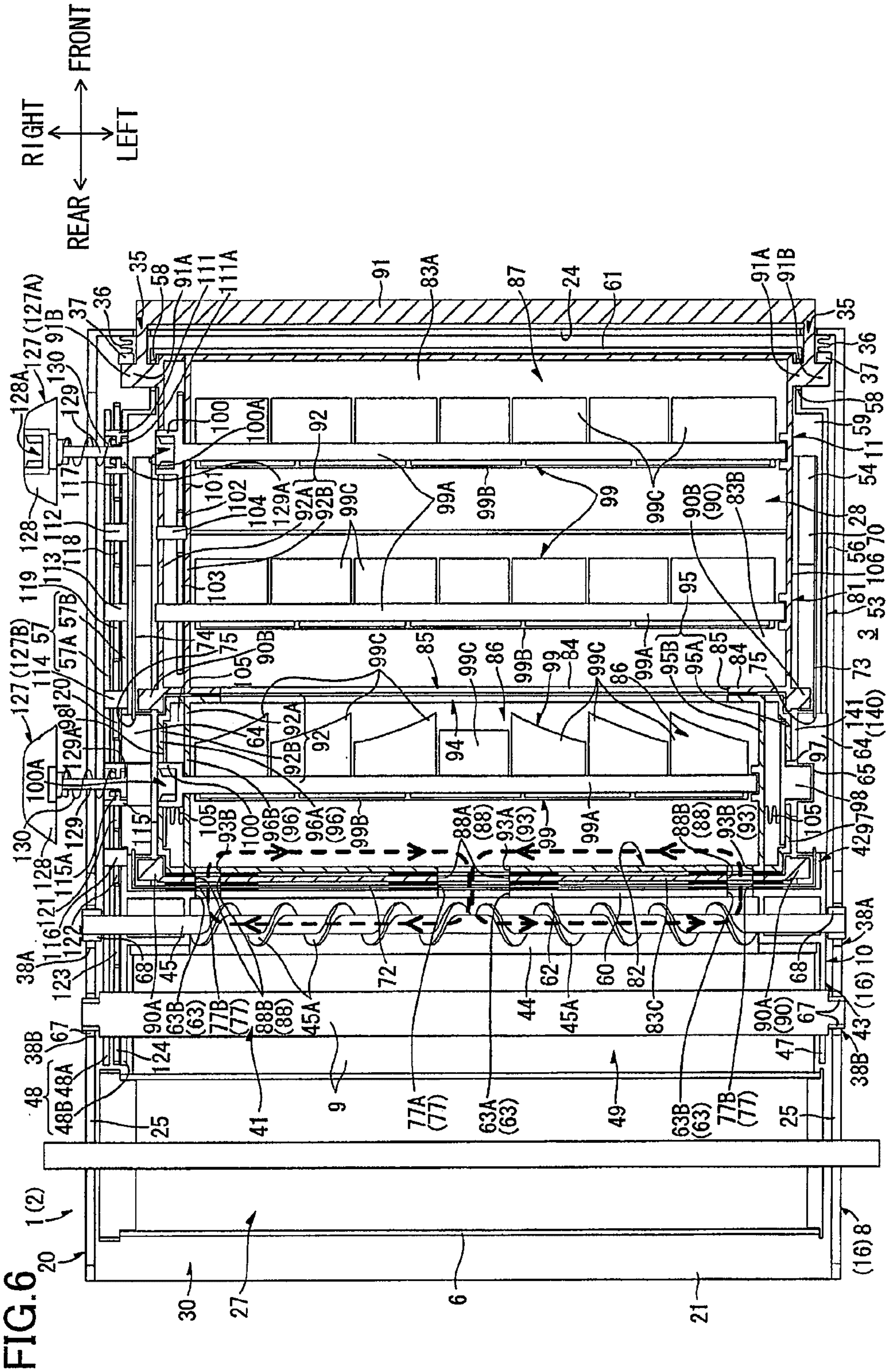
FIG. 6 is a cross-sectional plan view of the process cartridge taken along a line VI-VI of FIG. 1.

As shown in FIG. 6, notches 35 are formed in both widthwise end sections of the front wall 24. Each notch 35 is formed in the upper edge of the front wall 24 so as to penetrate the front wall 24 in the width direction. Coil springs 36 are disposed on the rear surface of the front wall 24 (the surface confronting the developing-section accommodating chamber 28) at positions adjacent to the outer widthwise sides of the notches 35. The coil springs 36 protrude rearward toward the developing-section accommodating chamber 28. Block-shaped pressing members 37 are mounted on the rear ends of the coil springs 36, forming integral units with the coil springs 36.

As shown in FIG. 6, each of the side walls 25 is formed with a front elongated hole 38A and a rear elongated hole 38B at positions frontward of the photosensitive drum 6. The front elongated hole 38A and the rear elongated hole 38B are aligned in the front-to-rear direction and elongated in the front-to-rear direction, and penetrate the side wall 25 in the width direction.

As shown in FIG. 2(*a*), the developing section 10 has a hollow box shape that is elongated in the width direction and flattened vertically. The developing section 10 is just large enough to be accommodated in the developing-section accommodating chamber 28 (FIG. 1).

The developing section 10 is integrally provided with a developing part 41 forming approximately one-third of the developing section 10 on the rear side thereof, and a cartridge accommodating part 42 formed continuously from the front side of the developing part 41.

The developing part 41 includes a developing casing 43, the developing roller 9, a supply roller 44, a conveying auger 45, and a thickness-regulation blade 46.

The developing casing 43 is a hollow member elongated in the width direction. As shown in FIGS. 2(*b*) and 2(*d*), when viewed along the width direction, the developing casing 43 has a fan-like shape, swelling toward the upper rear direction in an arch shape. The developing casing 43 has a left wall 47, a right wall 48 (FIG. 2(*a*)), a bottom wall 50, a top wall 51, and a front wall 62. Left and right surfaces of the developing casing 43 (a left surface of the left wall 47 and a right surface of the right wall 48) are flat and aligned in a vertical plane. An exposure hole 49 elongated in the width direction is formed at the rear side of the developing casing 43. Interior of the developing casing 43 is exposed to the rear side through the exposure hole 49. When viewed along the width direction, the bottom wall 50 is in an arc shape slightly swelling downward. A rear section 50A of the bottom wall 50 protrudes rearward at a position below the exposure hole 49. The rear section 50A guides the recording paper P entered the drum section 8 through the inlet 29 to the transfer position between the photosensitive drum 6 and the transfer roller 13 (FIG. 1).

As shown in FIG. 2(*a*), the developing casing 43 accommodates therein the developing roller 9, the supply roller 44, the conveying auger 45, and the thickness-regulation blade 46.

The developing roller 9 has a center axis extending in the width direction, and lateral ends thereof are rotatably supported to the left wall 47 and the right wall 48 of the developing casing 43. A rear section of the outer peripheral surface of the developing roller 9 is exposed to the rear side through the exposure hole 49, as shown in FIG. 2(*b*). The lateral ends of the developing roller 9 protrude outward in the width direction from the left wall 47 and the right wall 48, and are fitted in respective cylindrical collars 67 (FIGS. 2(*b*) and 2(*d*)).

The supply roller 44 has a center axis extending in the width direction, and lateral ends thereof are rotatably supported to the left wall 47 and the right wall 48. The supply roller 44 is in contact with a lower front section of the developing roller 9 as shown in FIG. 2(*a*). The supply roller 44 disposed above the bottom wall 50 has a lower peripheral surface that conforms to the shape of the bottom wall 50 protruding downward in an arc shape.

As shown in FIG. 6, the conveying auger 45 is integrally provided with a central shaft and blades 45A. The central shaft is a narrow cylinder that extends in the width direction.

The blades 45A wind around the central shaft in a spiral shape from the widthwise center of the central shaft to both widthwise ends thereof. Lateral ends of the conveying auger 45 are rotatably supported to the left wall 47 and the right wall 48. As shown in FIG. 2(*a*), the conveying auger 45 confronts the upper section of the supply roller 44 with a space therebetween, and confronts the front section of the developing roller 9 with a space therebetween. The lateral ends of the conveying auger 45 protrude outward in the width direction from the left wall 47 and the right wall 48, and are fitted in respective cylindrical collars 68 (FIGS. 2(*b*) and 2(*d*)). Note that a section of the conveying auger 45 with the blades 45A formed therein will be referred to as "blade section."

The thickness-regulation blade 46 is formed in a plate shape that extends in the width direction and the vertical direction within the developing casing 43. The thickness-regulation blade 46 has an upper base end fixed to the top wall 51 of the developing casing 43, and a lower free end that is in press contact with the entire width of the front peripheral surface of the developing roller 9.

A film-shaped seal member 52 is disposed on the upper surface of the bottom wall 50 (the surface confronting the interior of the developer casing 43) and is in contact with the entire width of the lower section of the outer peripheral surface of the developing roller 9.

The cartridge-accommodating part 42 includes a main part 53 and a receiving part 54. The main part 53, the drum case 20 (FIG. 1), and the developing casing 43 together function as a developing frame. The main part 53 is in a hollow box shape flattened in the vertical direction. Nearly the entire top surface of the main part 53 is open, exposing the interior of the main part 53 from a top perspective. This opening is an exposure opening 55. The width dimension of the main part 53 is substantially the same as that of the developing part 41, and the vertical dimension of the main part 53 is substantially the same as that of the developing part 41. The front-to-rear dimension of the main part 53 is two to three times that of the developing part 41.

The main part 53 has a left wall 56, a right wall 57, a bottom wall 59, a rear wall 60, and a front wall 61. Both the left and right walls 56 and 57 are plate-shaped and formed thin in the width direction. When viewed along the width direction, the left wall 56 and the right wall 57 are substantially rectangular and elongated in the front-to-rear direction. Three of the four corners of each of the left and right walls 56 and 57, excluding the top front corner, are rounded.

The left wall 56 is formed continuously with the front side of the left wall 47 of the developing casing 43 of the developing part 41, and left surfaces of the left wall 56 and the left wall 47 are substantially flush with each other (FIGS. 2(*b*) and 2(*d*)). The right wall 57 is formed continuously with the front side of the right wall 48 of the developing casing 43, and the right surfaces of the right wall 57 and the right wall 48 are substantially flush with each other.

A cutout 58 is formed in each of the left wall 56 and the right wall 57 at substantially opposing positions in the front ends thereof. Each of the notches 58 is formed in the front end of the respective left wall 56 or right wall 57 as a cutout in the upper edge thereof that penetrates the respective wall 56 or 57 in the width direction. Each of the notches 58 is slightly curved so as to extend downward toward the front side thereof. The bottom end of the notch 58 is positioned substantially in the vertical center of the corresponding left wall 56 or right wall 57. When viewed along the width direction, the notches 58 follow an arc shape having an arc center positioned farther rearward.

The bottom wall 59 of the main part 53 is in a flat plate shape extending in the front-to-rear direction and spanning between lower edges of the left and right walls 56 and 57. The rear wall 60 is plate shaped and formed continuously with the rear edge of the bottom wall 59 and spanning between the rear edges of the left wall 56 and the right wall 57. When viewed along the width direction, the rear wall 60 forms an arc shape that is convex on the rear side. The top edge of the rear wall 60 extends diagonally upward and frontward. The front wall 61 is plate shaped and has a thin front-to-rear dimension. The front wall 61 is formed continuously with the front edge of the bottom wall 59 and spans between the front edges of the left wall 56 and the right wall 57. When viewed along the width direction, the front wall 61 extends upward while curving in an arc.

The rear wall 60 is formed continuously with the front side of the front wall 62 of the developing casing 43. As shown in FIG. 6, three through-holes 63 are formed in the rear wall 60 and the front wall 62 at intervals in the width direction. The through-holes 63 penetrate the rear wall 60 and the front wall 62 in the front-to-rear direction. The center through-hole 63 is a supply hole 63A, while the two through-holes 63 on the left and right ends are recovery holes 63B. The through-holes 63 establish communication between the interior of the developing casing 43 and the interior of the main part 53. The supply hole 63A opposes a widthwise center portion of the blade section of the conveying auger 45 from the front side thereof. The left recovery hole 63B opposes the left end of the blade section from the front side, while the right recovery hole 63B opposes the right end of the blade section from the front side.

As shown in FIG. 2(*a*), support parts 64 are integrally provided on respective rear ends of the left wall 56 and the right wall 57 of the main part 53. The support parts 64 occupy the same position when viewed along the width direction and are fixed to the respective left wall 56 and the right wall 57. When viewed along the width direction, each support part 64 has a disc shape whose circular center is aligned with the arc center of the rear wall 60 of the main part 53. As shown in FIG. 6, the support parts 64 protrude farther inward in the width direction (into the interior of the main part 53) than the inner widthwise surfaces of the corresponding left wall 56 and right wall 57. As shown in FIG. 2(*a*), the outer rear edge of each support part 64 is positioned farther frontward than the rear wall 60.

The inner widthwise surface of each support part 64 is substantially flat and aligned with a vertical plane. A first guide groove 65 (serving as a first guide and a guide) is formed as a recess in the inner widthwise surface of each support part 64 so as to penetrate through the support part 64 in a radial direction thereof. More specifically, each first guide groove 65 formed in the respective support part 64 extends linearly in the radial direction of the support part 64, sloping upward toward the front and passing through the circular center of the support part 64. The width of the first guide groove 65 is substantially uniform, except near the edges of the support part 64 where the first guide groove 65 grows gradually wider toward the top front end and toward the bottom rear end.

A rear through-hole 66B is formed in the circular center of the right support part 64 provided on the right wall 57 and penetrates the support part 64 and the right wall 57 in the width direction. A front through-hole 66A is formed in the front end of the right wall 57 at a position adjacent to and to the rear of the lower end of the notch 58 and penetrates the right wall 57 in the width direction. The two through-holes 66A and 66B are circular and aligned in the front-to-rear direction.

As shown in FIG. 6, the right wall 57 has a double-wall structure. Specifically, the right wall 57 includes an outer wall 57A positioned relatively on the right side (the outer widthwise side), and an inner wall 57B positioned relatively on the left side (the inner widthwise side). The outer wall 57A confronts the right side of the inner wall 57B with a gap formed therebetween. The outer wall 57A and the inner wall 57B define an inner space therebetween, and a first support shaft 111, a second support shaft 112, a third support shaft 113, a fourth support shaft 114, a fifth support shaft 115, and a sixth support shaft 116 are aligned in this order from the front side to the rear side within the inner space.

The right wall 48 of the developing casing 43 also has a double-wall structure, including an outer wall 48A positioned relatively on the right side (the outer widthwise side), and an inner wall 48B positioned relatively on the left side (the inner width side). The outer wall 48A confronts the right side of the inner wall 48B with a gap formed therebetween.

The outer wall 48A is connected to the rear side of the outer wall 57A of the main part 53, and the inner wall 48B is connected to the rear side of the inner wall 57B of the main part 53. Thus, an inner space defined between the outer wall 48A and the inner wall 48B of the developing casing 43 is located on the rear side of and in fluid communication with the inner space defined between the outer wall 57A and the inner wall 57B of the main part 53. The right end of the conveying auger 45 (the right end portion of the conveying auger 45 disposed left of the right collar 68) and the right end of the developing roller 9 (the right end portion of the developing roller 9 disposed left of the right collar 67) are arranged in a front-to-rear sequence in the inner space defined between the outer wall 48A and the inner wall 48B.

The first support shaft 111, the second support shaft 112, the third support shaft 113, the fourth support shaft 114, the fifth support shaft 115, and the sixth support shaft 116 are all spanning in the width direction between the outer wall 57A and the inner wall 57B.

More specifically, as shown in FIG. 2(*a*), the first support shaft 111 is rotatably fitted in the front through-hole 66A of the right wall 57, and the fifth support shaft 115 is rotatably fitted in the rear through-hole 66B.

The first and fifth support shafts 111 and 115 are cylindrically shaped and open on both left and right ends. Thus, the interiors of the first and fifth support shafts 111 and 115 are exposed on the right side of the outer wall 57A and the left side of the inner wall 57B (within the main part 53). Annular protrusions 111A and 115A are integrally provided on the inner surfaces of the respective first and fifth support shafts 111 and 115 in substantially the widthwise center thereof, so as to protrude toward the respective circular centers thereof.

As shown in FIG. 6, the main part 53 is provided with two input units 127. Left ends of the input units 127 penetrate the hollow interior of the respective first and fifth support shafts 111 and 115 from the right side thereof. Hereafter, the input unit 127 on the first support shaft 111 side (front side) will be referred to as the front input unit 127A, and the input unit 127 on the fifth support shaft 115 side (rear side) will be referred to as the rear input unit 127B. Both of the input units 127 are positioned outside (to the right) of the toner cartridge 11 mounted in the developing unit 16.

Each input unit 127 is integrally provided with a pressable part 128 substantially shaped like the frustum of a cone that tapers toward the right, and a shaft part 129 extending leftward from the left surface of the pressable part 128 near the center region thereof.

The right surface of the pressable part 128 of the rear input unit 127B is flat, while the right surface of the pressable part 128 of the front input unit 127A has a recessed part 128A formed in the circular center thereof.

The left end 129A of each shaft part 129 is formed differently from the rest of the shaft part 129 (the portion rightward of the left end 129A) and resembles the head of a hammer.

In each input unit 127, the shaft part 129 penetrates the hollow interior of the respective first support shaft 111 or fifth support shaft 115 from the right side thereof. Each input unit 127 is supported on the respective first support shaft 111 or fifth support shaft 115 so as to be capable of sliding in the width direction. Specifically, the input units 127 can advance and retract along the width direction between a release position and an input position.

In the release position, the input unit 127 is retracted toward the right, as shown in FIG. 6. At this time, the left end 129A of each shaft part 129 is accommodated in the respective first support shaft 111 or fifth support shaft 115 and protrudes very little leftward from the inner wall 57B of the right wall 57 of the main part 53. Further, because the left end 129A of each shaft part 129 is in contact with either the protrusion 111A or 115A on the left side thereof, the input units 127 are prevented from retracting farther rightward from the release position and from coming out of the first support shaft 111 or the fifth support shaft 115.

When in the input position (not shown), the input units 127 are advanced leftward from the release position. At this time, the left ends 129A of the shaft parts 129 have moved out of the respective first and fifth support shafts 111 and 115 and protrude into the interior of the main part 53 leftward of the inner wall 57B. Each input unit 127 is also provided with a coil spring 130 extending in the width direction that is fitted over the corresponding shaft part 129. Each coil spring 130 is interposed between the left surface of the corresponding pressable part 128 and the respective protrusion 111A or 115A while in a compressed state. Accordingly, each input unit 127 is constantly urged to move from the input position (not shown) toward the release position by the restoring force of the coil spring 130.

In the inner space defined between the outer wall 57A and the inner wall 57B of the right wall 57, gears 117, 118, 119, 120, 121, and 122 are aligned in this order from the front side to the rear side. Each of the gears 117, 118, 119, 120, 121, and 122 is in a circular plate shape with a center axis extending in the width direction and formed with gear teeth on its outer peripheral surface. Also, in the inner space defined between the outer wall 48A and the inner wall 48B of the developing casing 43, gears 123 and 124 are aligned in this order from the front side to the rear side.

The first support shaft 111 is inserted into the circular center of the gear 117 so that the first support shaft 111 and the gear 117 form a single unit. The fifth support shaft 115 is inserted into the circular center of the gear 121 so that the fifth support shaft 115 and the gear 121 form a single unit. The right end of the conveying auger 45 is inserted into the circular center of the gear 123 so that the conveying auger 45 and the gear 123 form a single unit. The right end of the developing roller 9 is inserted into the circular center of the gear 124 so that the developing roller 9 and the gear 124 form a single unit.

The second support shaft 112 is inserted into the circular center of the gear 118. The third support shaft 113 is inserted into the circular center of the gear 119. The fourth support shaft 114 is inserted into the circular center of the gear 120. The sixth support shaft 116 is inserted into the circular center of the gear 122. The gears 118, 119, 120, and 122 are freely rotatably supported to respective support shafts 112, 113, 114, and 116. The gears 117, 118, 119, 120, 121, 122, 123, and 124 are in meshing engagement with adjacent gear(s).

The receiving part 54 (FIG. 2(*a*)) is a hollow member and just large enough to be accommodated in the rear section of the internal space of the main part 53

Based on the orientation shown in FIG. 2(*a*), the receiving part 54 is integrally provided with a bottom wall 70, a top wall 71, a rear wall 72, a left wall 73, and a right wall 74. The shape of each wall will be described based on the orientation shown in FIG. 2(*a*).

The left wall 73 and the right wall 74 are disposed in confrontation with each other and spaced apart from each other in the width direction. When viewed along the width direction, the left wall 73 and the right wall 74 have the same shape. More specifically, each of the left wall 73 and the right wall 74 is in a plate shape having a thin thickness in the width direction and a long dimension in the front-to-rear direction. When viewed along the width direction, each of the left wall 73 and the right wall 74 has a rear edge in an arc shape swelling rearward, an upper edge extending straight from an upper end of the rear edge toward the front side, a lower edge extending straight from a lower end of the rear edge toward the front side, a front edge extending straight from a front end of the upper edge in a direction toward the lower front side and connected to a front end of the lower edge. Thus, a front section of each of the left wall 73 and the right wall 74 is substantially in a triangular shape when viewed along the width side. A radius of curvature of the arc-shaped rear edge of each of the left wall 73 and the right wall 74 is substantially equal to a radius of curvature of the arc-shaped rear wall 60 of the main part 53.

A circular hole 75 is formed in each of the left wall 73 and the right wall 74 at substantially opposing positions in the rear ends thereof so as to penetrate the left wall 73 or the right wall 74 in the width direction. When viewed along the width direction, the center of each circular hole 75 is substantially aligned with the arc center of the arc-shaped rear edge on the respective left wall 73 and right wall 74. The diameter of the circular holes 75 is approximately equivalent to the outer diameter of the support part 64 described above.

A second guide groove 76 (serving as a second guide and a guide) is formed in the inner widthwise surface of each of the left wall 73 and the right wall 74. The second guide grooves 76 are at identical positions in the width direction.

Based on the orientation shown in FIG. 2(*a*), the second guide grooves 76 extend linearly along a substantially horizontal direction and pass through the vertical center of the respective left wall 73 and right wall 74 (hereinafter referred to as the "respective walls 73 and 74") and the circular center of the respective circular holes 75. The second guide grooves 76 recessed in the respective walls 74 and 75 penetrate these respective walls 74 and 75 in the front-to-rear direction so as to link the vertical centers in the rear edges of the respective walls 74 and 75 to the vertical centers of the front edges.

The width of the second guide groove 76 is substantially uniform and substantially the same as that of the first guide groove 65, except near the edges of the respective wall 74 or 75 where the second guide groove 76 grows gradually wider toward the right and left ends. Each second guide groove 76 is linked to the respective circular hole 75, which interrupts the continuity of the second guide groove 76 midway. The section of the second guide groove 76 frontward of the circular hole 75 will also be referred to as a front second guide groove 76A, while the section rearward of the circular hole 75 will also be referred to as a rear second guide groove 76B.

The bottom wall 70 is in a flat plate shape and spans between the lower edges of the left wall 73 and the right wall 74. The top wall 71 is in a flat plate shape and spans between the upper edges of the left wall 73 and the right wall 74. The rear wall 72 is plate-shaped and curves in an arc shape when viewed along the width direction. The radius of curvature of the rear wall 72 is identical to that of the arc-shaped rear edges of the left wall 73 and right wall 74. The rear wall 72 spans between the rear edges of the left wall 73 and the right wall 74 and between the rear edges of the bottom wall 70 and the top wall 71.

As shown in FIGS. 2(*a*) and 6, three through-holes 77 are formed in the vertical center of the rear wall 72 (the portion of the rear wall 72 that protrudes farthest rearward). The through-holes 77 are formed at intervals in the width direction and penetrate the rear wall 72 in the front-to-rear direction. The center through-hole 77 will be referred to as a supply hole 77A, while the two through-holes 77 positioned on the left and right ends of the rear wall 72 will be referred to as recovery holes 77B. Sealing members 78 formed of a sponge or the like are mounted on both the front and rear surfaces of the rear wall 72 so as to encircle each through-hole 77 (the sealing members 78 are depicted by bold black lines in the drawings).

An opening defined in the receiving part 54 by the front edges of the left wall 73, the right wall 74, the top wall 71, and the bottom wall 70 is a receiving hole 79 (FIG. 2(*a*)). The receiving hole 79 exposes the interior of the receiving part 54 from a perspective above the receiving part 54 (above and frontward in FIG. 2(*a*)).

The receiving part 54 is accommodated in a rear side area within the main part 53. In this state, the support part 64 on the left wall 56 of the main part 53 is inserted into the circular hole 75 of the left wall 73 from the widthwise outer side (left side) thereof, and the support part 64 on the right wall 57 of the main part 53 is inserted into the circular hole 75 of the right wall 74 from the outer widthwise side (right side) thereof (see also FIG. 6). At this time, the widthwise inner surfaces of the left wall 73 and the right wall 74 are substantially flush with the widthwise inner surfaces of the support parts 64 on the same widthwise side.

The receiving part 54 is supported in the main part 53 so as to be capable of rotating about the left and right support parts 64. More specifically, the receiving part 54 can rotate between a first position (shown in FIGS. 2(*c*) and 2(*d*)) and a second position (shown in FIGS. 2(*a*) and 2(*b*)). The position of the second guide grooves 76 formed in the left wall 73 and the right wall 74 of the receiving part 54 will also be referred to as the first position when the receiving part 54 is in the first position (see FIG. 2(*c*)) and the second position when the receiving part 54 is in the second position (see FIG. 2(*a*)).

When in the first position shown in FIG. 2(*c*), the receiving part 54 as a whole slopes diagonally upward and frontward from the circular hole 75 side along the first guide groove 65. At this time, the receiving hole 79 faces almost directly upward, and the portion of the receiving part 54 surrounding the receiving hole 79 protrudes above the exposure opening 55 formed in the main part 53. Further, the top wall 71 of the receiving part 54 extends diagonally upward and frontward, while the lower front side of the top wall 71 contacts the upper edge of the rear wall 60 of the main part 53. Through this contact, the receiving part 54 is prevented from rotating farther counterclockwise in a left side view from the first position.

Further, the second guide grooves 76 formed in the left wall 73 and the right wall 74 and the first guide grooves 65 formed in the support parts 64 on the respective widthwise sides are aligned (continuous) with each other and form a single straight line that extends diagonally upward and frontward. When viewed along the width direction, each first guide groove 65 is positioned midway along the corresponding second guide groove 76, i.e., is interposed between the corresponding front and rear second guide grooves 76A and 76B. Thus, it can be said that the front and rear second guide grooves 76A and 76B are linked via the corresponding first guide groove 65 on each widthwise side.

In addition, the through-holes 77 formed in the rear wall 72 of the receiving part 54 oppose parts of the rear wall 60 of the main part 53 that are positioned lower than the through-holes 63 from a position diagonally above and frontward thereof. Thus, these parts of the rear wall 60 close the through-holes 77 on the lower rear side. On the other hand, the through holes 63 oppose parts of the rear wall 72 of the receiving part 54 that are positioned above the through-holes 77 from a position rearward thereof. Thus, these parts of the rear wall 72 close the through holes 63 on the front side.

As the receiving part 54 is subsequently rotated clockwise in a left side view from the first position, the rotation of the receiving part 54 is halted when the bottom wall 70 of the receiving part 54 contacts the top of the bottom wall 59 of the main part 53, as shown in FIG. 2(*a*). At this time, the receiving part 54 is in the second position.

When in the second position, the receiving part 54 as a whole extends in the front-to-rear direction (horizontally in FIG. 2(*a*)) and is entirely accommodated within the main part 53. Thus, no portion of the receiving part 54 protrudes higher than the exposure opening 55 in the main part 53, unlike when the receiving part 54 is in the first position shown in FIG. 2(*c*).

Further, while the second guide grooves 76 in the first position extend diagonally upward and frontward when the receiving part 54 is in the first position (see FIG. 2(*c*)), the second guide grooves 76 are in the second position when the receiving part 54 is in the second position and extend along the front-to-rear direction. Consequently, the second guide grooves 76 in the second position intersect with the first guide grooves 65 that are still angled diagonally upward and frontward when viewed in the width direction. Thus, the continuous state of the first guide grooves 65 and the corresponding second guide grooves 76 is interrupted. Specifically, each second guide groove 76 has been completely separated into the front second guide groove 76A and the rear second guide groove 76B, and both ends of each first guide groove 65 (the upper front end and lower rear end) are blocked by portions of the respective walls 73 and 74 in which the second guide groove 76 is not formed.

When the second guide grooves 76 are in the second position and extending in the front-to-rear direction, the front through-hole 66A and the rear through-hole 66B are aligned in the front-to-rear direction along a straight line formed as an extension of the respective second guide groove 76 when viewed along the width direction.

Further, when the receiving part 54 is in the second position, the through-holes 77 formed in the receiving part 54 are positioned opposite the through-holes 63 formed in the rear wall 60 of the bottom wall 50 on the front side thereof. More specifically, the supply hole 77A is in communication with the supply hole 63A, and the left and right recovery holes 77B are in communication with the respective left and right recovery holes 63B (see FIG. 6).

From the second position, the receiving part 54 can be rotated counterclockwise in a left side view in order to move the receiving part 54 to the first position shown in FIGS. 2(*c*) and 2(*d*).

As shown in FIG. 1, the developing section 10 having the structure described above is accommodated in the developing-section accommodating chamber 28 of the drum section 8. In this state, the receiving part 54 of the developing section 10 described above is exposed above the drum section 8 through the through-hole 26 formed in the drum case 20.

Further, the developing section 10 contacts the tops of the plurality of protrusions 34 formed on the upper surface of the bottom wall 21. This contact sets the vertical position of the developing section 10 in the developing-section accommodating chamber 28.

As shown in FIG. 6, the left end of the conveying auger 45 provided in the developing section 10 (i.e., the part of the conveying auger 45 fitted into the collar 68) is inserted from the inner widthwise side (right side) into the front elongated hole 38A formed in the left side wall 25 of the drum section 8. Also, the left end of the developing roller 9 (i.e., the part of the developing roller 9 fitted into the collar 67) is inserted from the inner widthwise side into the rear elongated hole 38B formed in the left side wall 25. Further, the right end of the conveying auger 45 (i.e., the part of the conveying auger 45 fitted into the collar 68) is inserted from the inner widthwise side (left side) into the front elongated hole 38A formed in the right side wall 25 of the drum section 8. Moreover, the right end of the developing roller 9 (i.e., the part of the developing roller 9 fitted into the collar 67) is inserted from the inner widthwise side into the rear elongated hole 38B formed in the right side wall 25.

In this state, both widthwise ends of each of the developing roller 9 and the conveying auger 45 can move within the elongated holes 38A and 38B along the longitudinal direction thereof (front-to-rear direction). Consequently, when the entire developing section 10 provided with the developing roller 9 and the conveying auger 45 is accommodated in the developing-section accommodating chamber 28, the developing section 10 becomes an integral unit with the drum section 8 and is supported in the drum section 8 so as to be capable of moving relatively thereto in the front-to-rear direction.

As shown in FIG. 3(*b*), the toner cartridge 11 is a hollow member in a box shape elongated in the width direction and flattened in the vertical direction. The toner cartridge 11 is just large enough to be accommodated in the main part 53 of the developer section 10 (FIG. 2(*a*)).

As shown in FIG. 3(*b*), the toner cartridge 11 has an outer casing 81 (serving as a developer frame) and an inner casing 82 (serving as a shutter).

The outer casing 81 is integrally formed of a plurality (three in this embodiment) of sub-casing 83 juxtaposed in the front-to-rear direction. Each sub-casing 83 is substantially cylindrical in shape with a central axis extending in the width direction. The widthwise ends of each sub-casing 83 are closed. When viewed along the width direction, the interior space of each sub-casing 83 is substantially circular.

Figure 4A:
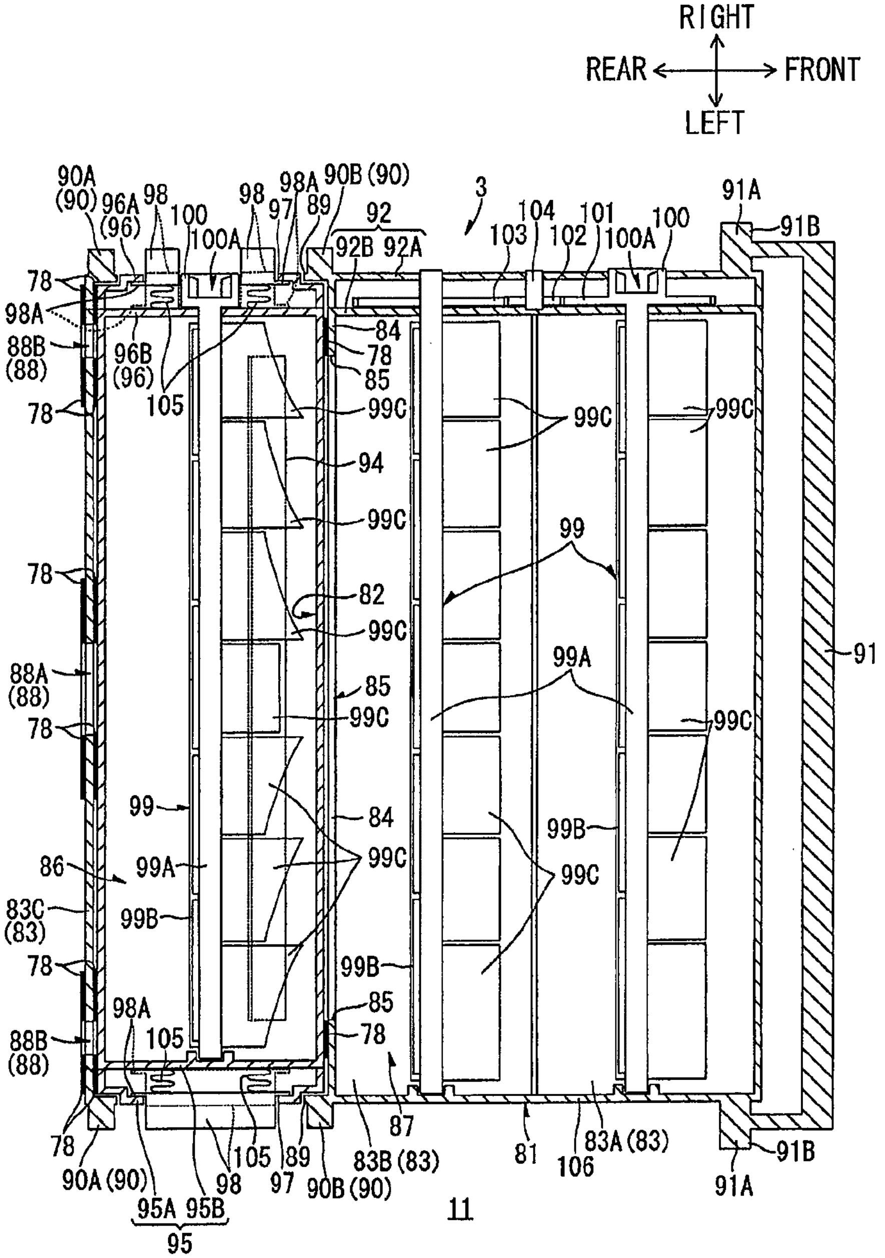
FIG. 4(*a*) is a cross-sectional view taken along a line IVa-IVa of FIG. 3(*b*)
Figure 4B:
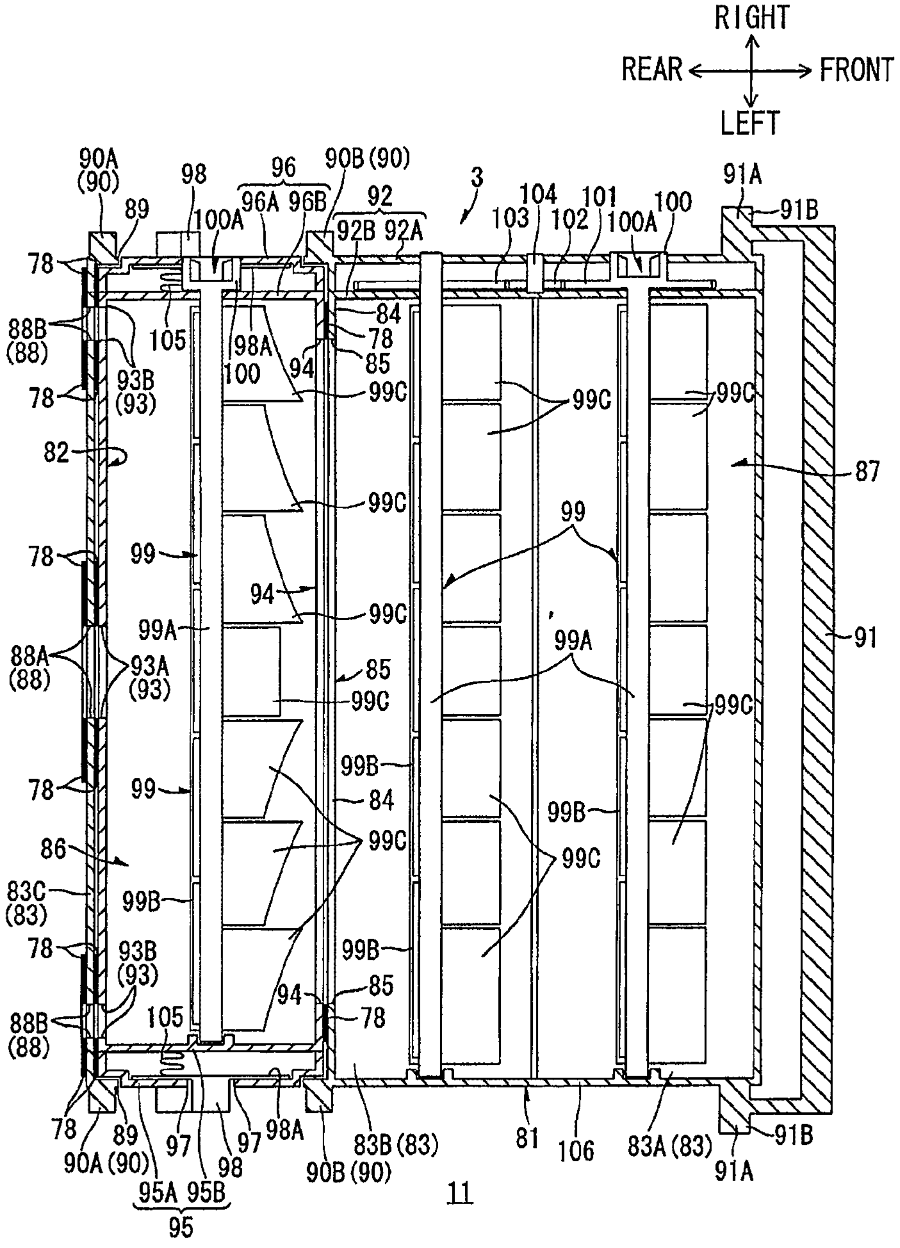

The sub-casings 83 include a front sub-casing 83A, a middle sub-casing 83B, and a rear sub-casing 83C in order from front to rear. An internal space of the front sub-casing 83A is directly fluidly connected to an internal space of the middle sub-casing 83B. On the other hand, the internal spaces of the middle sub-casing 83B and the rear sub-casing 83C are partitioned by a partitioning wall 84. When viewed along the width direction, the partitioning wall 84 constitutes a part of circular contour of the rear sub-casing 83C, and protruding frontward in an arc shape toward the middle sub-casing 83B. A communication hole 85 is formed in the partitioning wall 84 in the lower part thereof. The communication hole 85 penetrates through the partitioning wall 84 in the front-to-rear direction and has a long dimension in the width direction as shown in FIG. 4(*b*). The communication hole 85 fluidly connects the internal space of the middle sub-casing 83B to the internal space of the rear sub-casing 83C.

The internal space of the rear sub-casing 83C serves as a first chamber 86, and the internal spaces of the front and middle sub-casings 83A and 83B together serve as a second chamber 87. A new toner cartridge 11 accommodates a predetermined amount of toner in the second chamber 87.

As shown in FIG. 4(*a*), three through holes 88 are formed in the rear peripheral wall portion of the rear sub-casing 83C. The through holes 88 are formed at intervals in the width direction and penetrate the peripheral wall in the front-to-rear direction along the radial direction of the rear sub-casing 83C so as to provide direct communication with the first chamber 86. The center through hole 88 is a supply hole 88A, and the two through holes 88 on the left and right ends are recovery holes 88B.

The sealing members 78 are mounted on both the front surface (surface facing the first chamber 86) and the rear surface of the rear sub-casing 83C on the rear side thereof, as well as the rear surface of the partitioning wall 84 (surface facing the first chamber 86), so as to frame the through-holes 88 and the communication hole 85.

As described above, the internal space of the outer casing 81 is partitioned into the first chamber 86 that is directly fluidly connected to the through holes 88 and the second chamber 87 that is fluidly connected to the first chamber 86 through the communication hole 85.

As shown in FIGS. 3(*a*) and 3(*c*), an exposure hole 89 is formed in both the left and right surfaces of the rear sub-casing 83C (outer surfaces of the outer casing 81). The exposure holes 89 are circular holes whose centers are aligned with the circular center of the rear sub-casing 83C. The exposure holes 89 are in communication with the first chamber 86.

Each of the left and right surfaces of the rear sub-casing 83C is integrally formed with a pair of outer protrusions 90 (serving as second guided members) that protrude outward in the width direction, at positions interposing the exposing hole 89 in the front-to-rear direction. The outer protrusions 90 are fixed to the rear sub-casing 83C (the outer casing 81). Each pair of outer protrusions 90 include a rear outer protrusion 90A located on the rear side and a front outer protrusion 90B located on the front side.

As shown in FIG. 4(*a*), the front sub-casing 83A is integrally formed with an operating part 91. An operator grips the operating part 91 when mounting the toner cartridge 11 in or removing the toner cartridge 11 from the developing unit 16 (the process cartridge 3). When viewed along a vertical direction, the operating part 91 appears substantially U-shaped, with the opening of the "U" on the rear side. The operating part 91 is fixed to the front sub-casing 83A so that the front sub-casing 83A is interposed between the sides of the operating part 91. More specifically, the substantially U-shaped operating part 91 has two distal parts 91A that are connected to the outer surfaces (left and right surfaces) of the front sub-casing 83A on the same widthwise side thereof. Each distal part 91A protrudes outward in the width direction from the corresponding outer widthwise surface of the front sub-casing 83A.

The section of the outer casing 81 including the front sub-casing 83A and the middle sub-casing 83B has a right wall 92. The right wall 92 is formed with a double-wall construction that includes an outer wall 92A positioned on the right side (outer widthwise side) and an inner wall 92B positioned on the left side (inner widthwise side). The inner wall 92B defines the right side of the second chamber 87 described above. The outer wall 92A is arranged parallel to the inner wall 92B and separated by a gap to the right side thereof.

As shown in FIG. 3(*b*), the inner casing 82 is substantially cylindrical in shape with a central axis extending in the width direction. Both widthwise ends of the inner casing 82 are closed. The inner casing 82 is just large enough to be accommodated in the rear sub-casing 83C (the first chamber 86).

As shown in FIG. 4(*b*), three through-holes 93 are formed in the rear peripheral wall portion of the inner casing 82. The through-holes 93 are formed at intervals in the width direction and penetrate the peripheral wall along a radial direction of the inner casing 82 so as to provide communication between the interior and exterior of the inner casing 82. The center through-hole 93 is a supply hole 93A, and the two through-holes 93 on the left and right ends are recovery holes 93B. An intake 94 elongated in the width direction is formed in the front peripheral wall portion of the inner casing 82. The intake 94 penetrates the peripheral wall along the radial direction of the inner casing 82 so as to provide communication between the interior and exterior of the inner casing 82.

Also, as shown in FIG. 4(*a*), each of the left wall 95 and the right wall 96 of the inner casing 82 has a double-wall structure. Specifically, the left wall 95 has an outer wall 95A and an inner wall 95B disposed in confrontation with each other. The outer wall 95A is located on the left side of and spaced away from the inner wall 95B. The right wall 96 has an outer wall 96A and an inner wall 96B disposed in confrontation with each other. The outer wall 96A is disposed on the right side of and spaced away from the inner wall 96B. The inner walls 95B and 96B define an inner space of the inner casing 82 in the width direction.

As shown in FIGS. 3(*a*) and 3(*c*), an exposure groove 97 is formed in each of the outer wall 95A of the left wall 95 and the outer wall 96A of the right wall 96. The exposure grooves 97 extend along a radial direction that passes through the circular center of the inner casing 82 and penetrate the respective outer wall 95A and outer wall 96A in the width direction. While the width of the exposure groove 97 formed in the left wall 95 is fixed (see FIG. 3(*a*)), the width of the exposure groove 97 formed in the right wall 96 expands in the circular center of the inner casing 82, with the sides of the exposure groove 97 formed in arc shapes (see FIG. 3(*c*)).

An inner protrusion 98 (serving as a first guided member) is inserted into the exposure groove 97 formed in each of the left wall 95 and the right wall 96. The inner protrusions 98 are inserted from the inner widthwise sides of the respective exposure grooves 97 and protrude outward in the width direction. In this way, each inner protrusion 98 is coupled with the respective left wall 95 and right wall 96. The inner protrusions 98 constitute part of the toner cartridge 11. When viewed along the width direction, each inner protrusion 98 extends along a radial of the inner casing 82 that passes through the circular center of the same. The inner protrusion 98 coupled with the right wall 96 is interrupted in the longitudinal center thereof (the region corresponding to the circular center of the inner casing 82; see FIG. 3(*c*)). Each inner protrusion 98 also has an engaging part 98A (FIG. 4(*a*)) formed on the inner widthwise side thereof.

Each inner protrusion 98 is capable of advancing and retracting in the width direction between an advanced position indicated by a solid line in FIG. 4(*a*) and a retracted position indicated by a dotted line in FIG. 4(*a*).

When in the advanced position, most of the inner protrusion 98 protrudes farther outward in the width direction from the outer widthwise surface of the outer wall 95A or 96A. At this time, the engaging part 98A contacts the outer wall 95A or 96A from the inner widthwise side and prevents the inner protrusion 98 from advancing farther outward in the width direction from the advanced position and from coming out of the exposure groove 97.

When in the retracted position, each inner protrusion 98 is positioned farther inside in the width direction than when in the advanced position, and the outer widthwise surface of the inner protrusion 98 is substantially flush with the outer widthwise surface of the corresponding outer wall 95A or 96A. Further, the inner widthwise surface of the inner protrusion 98 in the retracted position approaches the outer widthwise surface of the corresponding inner wall 95B or 96B from the outer widthwise side thereof so as to nearly contact the same.

Compressed springs 105 capable of expanding and contracting in the width direction are interposed between each inner protrusion 98 and the corresponding inner walls 95B and 96B. Accordingly, each inner protrusion 98 is constantly urged to move from the retracted position toward the advanced position by the restoring force of the spring 105. The inner casing 82 is accommodated in the first chamber 86 of the rear sub-casing 83C. In this condition, the left surface of the inner casing 82 (the left surface of the outer wall 95A of the left wall 95) and the right surface (right surface of the outer wall 96A of the right wall 96) are exposed outward in the width direction through the corresponding exposing holes 89 on the same widthwise sides (FIGS. 3(*a*), 3(*c*), 3(*d*), and 3(*f*)).

In this state, the left surface of the inner casing 82 is substantially flush with the left surface of the outer casing 81, and the right surface of the inner casing 82 is substantially flush with the right surface of the outer casing 81.

The inner protrusions 98 protrude farther outward in the width direction than the corresponding outer widthwise surface (outer endface) of the outer casing 81 when in the advanced position than when in the retracted position. The outer widthwise surfaces of the inner protrusions 98 in the advanced position are substantially flush with the outer widthwise surfaces of the outer protrusions 90 on the same widthwise sides. However, the outer widthwise surfaces of the inner protrusions 98 in the retracted position are substantially flush with the corresponding outer widthwise surfaces of the outer casing 81 and the inner casing 82.

While the retractable inner protrusions 98 are disposed in the inner casing 82, it could also be said that the inner protrusions 98 are disposed in the outer casing 81, since the inner casing 82 is accommodated in the first chamber 86 of the outer casing 81.

The inner casing 82 is rotatable relative to the rear sub-casing 83C about a circular center of the inner casing 82 (the circular center of the rear sub-casing 83C). In other words, the inner casing 82 (including the inner protrusions 98) is rotatably supported to the outer casing 81. More specifically, the inner casing 82 is rotatable between a closed position shown in FIGS. 3(*a*) to 3(*c*) and 4(*a*) and an open position shown in FIGS. 3(*d*) to 3(*f*) and 4(*b*) with respect to the outer casing 81.

When the inner casing 82 is in the closed position shown in FIGS. 3(*a*) and 3(*c*), the inner protrusions 98 link the rear outer protrusions 90A and the front outer protrusions 90B on the same widthwise sides (or more specifically, are positioned between the respective rear outer protrusions 90A and the front outer protrusions 90B) when viewing the toner cartridge 11 from the left and right sides. At this time, the inner protrusions 98 and the outer protrusions 90 on the same widthwise sides are positioned along a single straight line Z linking the rear outer protrusion 90A and the front outer protrusion 90B (the line Z extends in the front-to-rear direction in this case).

Further, as shown in FIG. 3(*b*), the through-holes 93 formed in the inner casing 82 are shifted upward from the through-holes 88 formed in the outer casing 81 (the rear sub-casing 83C), and the intake 94 formed in the inner casing 82 is shifted downward from the communication hole 85 formed in the partitioning wall 84 of the outer casing 81.

Consequently, a portion of the peripheral wall of the inner casing 82 beneath the through-holes 93 closes the through-holes 88 formed in the outer casing 81 on the front side (inner side along a radial of the rear sub-casing 83C), and a portion of the peripheral wall of the inner casing 82 above the intake 94 closes the communication hole 85 from the rear side (inner side along a radial of the rear sub-casing 83C; see also FIG. 4(*a*)). In other words, when the inner casing 82 is in the closed position, the inner casing 82 (strictly speaking the peripheral wall of the inner casing 82) closes both the through-holes 88 and the communication hole 85. In this state, the interior of the toner cartridge 11 is shut off from the exterior, and communication between the first chamber 86 (interior of the inner casing 82) and the second chamber 87 is interrupted (see also FIG. 4(*a*)).

From the closed position shown in FIG. 3(*a*), the inner casing 82 can be switched to the open position shown in FIG. 3(*d*) by twisting the inner protrusions 98 in a prescribed direction (counterclockwise in a left side view for the left inner protrusion 98, and clockwise in a right side view for the right inner protrusion 98) to rotate the inner casing 82 in the same prescribed direction (counterclockwise in a left side view).

When the inner casing 82 is at the open position, each inner protrusion 98 extends diagonally upward and frontward, and when viewed along the width direction, each intersects with the straight line Z and does not link the rear outer protrusion 90A and the front outer protrusion 90B (FIG. 3(*f*)).

Also, as shown in FIG. 3(*e*), the through-holes 93 formed in the inner casing 82 are positioned opposite the through holes 88 formed in the outer casing 81. More specifically, the supply hole 93A is in communication with the supply hole 88A, and the left and right recovery holes 93B are in communication with the respective left and right recovery holes 88B (see FIG. 4(*b*)). Further, the intake 94 formed in the inner casing 82 is positioned opposite and in communication with the communication hole 85 formed in the outer casing 81 on the rear side thereof (see FIG. 4(*b*)). That is, all of the through holes 88 and the communication hole 85 are open.

When the inner protrusions 98 are twisted a predetermined amount in a direction opposite to the predetermined direction from the state shown in FIGS. 3(*d*) and 3(*f*), then the inner casing 82 is returned to the closed position as shown in FIGS. 3(*a*) to 3(*c*).

As shown in FIG. 4(*a*), one agitator 99 is rotatably disposed inside each of the front sub-casing 83A, the middle sub-casing 83B, and the inner casing 82 (in other words, the rear sub-casing 83C accommodating the inner casing 82).

Each agitator 99 is integrally provided with a cylindrical rotational shaft 99A extended in the width direction, a support part 99B extending in the width direction along one peripheral location of the rotational shaft 99A and protruding radially outward therefrom, and blades 99C protruding outward from the support part 99B in a radial direction of the rotational shaft 99A (see also FIG. 3(*b*)). The rotational axis of each agitator 99 is aligned in the direction that the rotational shaft 99A extends (the width direction).

The rotational shafts 99A of the agitators 99 disposed in the front sub-casing 83A and the middle sub-casing 83B pass through the circular centers of the respective front sub-casing 83A and middle sub-casing 83B and span between a left wall 106 and the right wall 92 of the outer casing 81 in the front sub-casing 83A and the middle sub-casing 83B. The rotational shafts 99A are rotatably supported in the left wall 106 and the right wall 92 of the outer casing 81. The right ends of the rotational shafts 99A of the agitators 99 disposed in the front sub-casing 83A and the middle sub-casing 83B are exposed on the right side of the outer wall 92A of the right wall 92.

The rotational shaft 99A of the agitator 99 disposed in the inner casing 82 passes through the circular center of the inner casing 82, spans between the left wall 95 (more specifically, the inner wall 95B) and the right wall 96 of the inner casing 82, and is rotatably supported in the left wall 95 and the right wall 96 of the inner casing 82. The right end of the rotational shaft 99A in the inner casing 82 is exposed in the exposure groove 97 formed in the outer wall 96A of the right wall 96 from a perspective to the right of the outer wall 96A in a position aligned with the circular center of the inner casing 82 (see FIG. 3(*c*)).

The right ends of the rotational shafts 99A of the agitators 99 in the front sub-casing 83A and the inner casing 82 grow slightly wider than the rest of the rotational shafts 99A (the portion leftward of the right ends). This wider portion is an input part 100. A recessed part 100A is formed in the right endface of each input part 100.

Each input part 100 is disposed in the outer casing 81 so that the recessed part 100A is exposed to the right of the right surface on the outer casing 81.

The input part 100 of the agitator 99 in the inner casing 82 is positioned in the portion of the inner protrusion 98 that is interrupted in the right wall 96, but does not contact the inner protrusion 98. The right endface of this input part 100 is substantially flush with the right surface of the outer wall 96A of the right wall 96.

A gear 101 is fitted over the left end of the input part 100 on the agitator 99 provided in the front sub-casing 83A. The gear 101 has an annular shape with a central axis extending in the width direction and has gear teeth formed around the outer peripheral surface thereof. The gear 101 is integrally formed with the input part 100 and is positioned between the outer wall 92A and the inner wall 92B of the right wall 92 of the outer casing 81.

Gears 102 and 103 are disposed between the outer wall 92A and the inner wall 92B. Both the gears 102 and 103 are disc-shaped with a central axis extending in the width direction and gear teeth formed around the peripheral surface thereof. A support shaft 104 is disposed between the rotational shaft 99A of the agitator 99 in the front sub-casing 83A and the rotational shaft 99A of the agitator 99 in the middle sub-casing 83B in the front-to-rear direction. The support shaft 104 extends in the width direction and spans between the outer wall 92A and the inner wall 92B.

The support shaft 104 is inserted into the circular center of the gear 102 and is rotatably supported thereby. The rotational shaft 99A of the agitator 99 in the middle sub-casing 83B is inserted into the circular center of the gear 103 and is integrally formed therewith. The gear 102 is engaged with the rear side of the gear 101, and the gear 103 is engaged with the rear side of the gear 102.

The blades 99C are formed of a flexible film-like material. A plurality of the blades 99C is arranged on each agitator 99 along the width direction.

Next, the procedure for mounting the toner cartridge 11 in and removing the toner cartridge 11 from the developing unit 16 will be described. The toner cartridge 11 is mounted in and removed from the developing unit 16 when the process cartridge 3 has been removed from the main casing 2 (see FIG. 1).

Figures 5A, 5B:
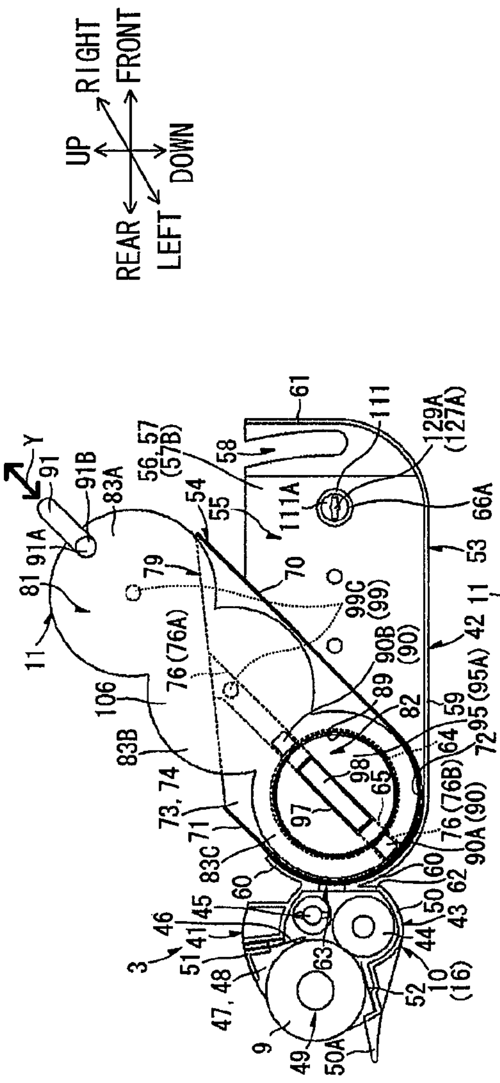
FIG. 5(*a*) is a partially-cross-sectional left side view of the process cartridge with the receiving part at the first position with a drum section omitted.
Figure 5C:
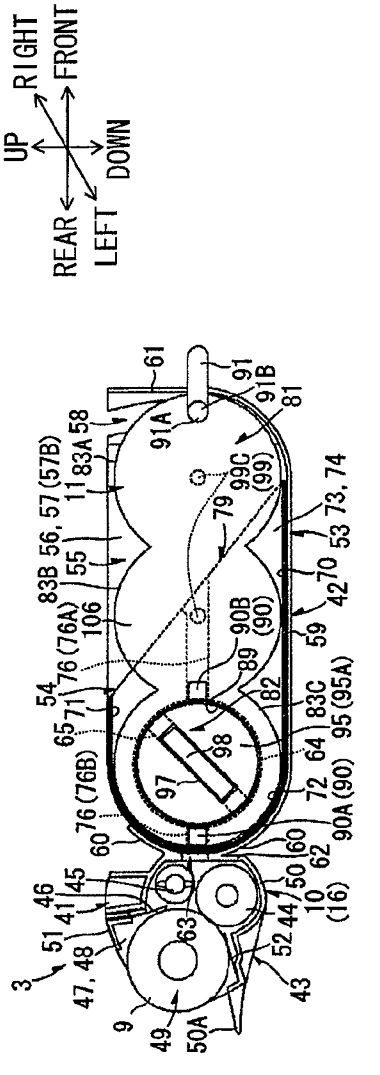
Figure 5D:
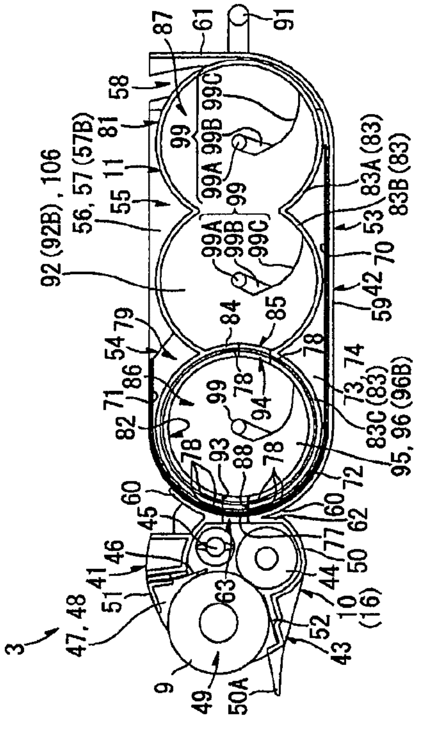

First, the procedure for mounting the toner cartridge 11 will be described. To begin with, the receiving part 54 of the developing section 10 described above is disposed in the first position as shown in FIGS. 5(*a*) and 5(*b*). Next, the operator grips the operating part 91 and holds the toner cartridge 11 with the inner casing 82 in the closed position at a slant so that the front sub-casing 83A is positioned above and frontward of the rear sub-casing 83C. The operator places the toner cartridge 11 in a position above and frontward of the receiving hole 79 formed in the receiving part 54.

Next, the operator inserts the toner cartridge 11 into the receiving part 54 in a direction diagonally downward and rearward so that the rear sub-casing 83C passes first through the receiving hole 79. At this time, the toner cartridge 11 is interposed between the left wall 73 and the right wall 74 of the receiving part 54 in the width direction, as illustrated in FIG. 5(*a*). Therefore, the first guide grooves 65 and the second guide grooves 76 provided in the left wall 73 and the right wall 74 are positioned on both widthwise sides of the toner cartridge 11.

As described above, the outer protrusions 90 and the inner protrusions 98 are positioned along a single straight line (the line Z shown in FIGS. 3(*a*) and 3(*c*)) at both left and right sides of the toner cartridge 11. Of the outer protrusions 90 and the inner protrusions 98, first the rear outer protrusions 90A are received in the respective second guide grooves 76 (strictly speaking, the front second guide grooves 76A) provided in the receiving part 54 on the same widthwise sides. The rear outer protrusions 90A slide diagonally downward and rearward along the front second guide grooves 76A. Following the rear outer protrusions 90A, the inner protrusions 98 and the front outer protrusions 90B are sequentially received in the front second guide grooves 76A and slide diagonally downward and rearward therein.

Hence, since the outer protrusions 90 and the inner protrusions 98 are guided by the left and right second guide grooves 76 sloping diagonally downward and rearward, the toner cartridge 11 also proceeds diagonally downward and rearward into the receiving part 54. In other words, the direction in which the toner cartridge 11 is mounted in the developing unit 16 (hereinafter simply referred to as the "mounting direction") is a direction diagonally downward and rearward.

While being inserted diagonally downward and rearward, the toner cartridge 11 is maintained in a sloped orientation with the front sub-casing 83A positioned above and frontward of the rear sub-casing 83C. Hence, the three sub-casings 83A-83C are aligned in a direction proceeding opposite the mounting direction away from the supply hole 88A formed in the rear end of the rear sub-casing 83C (see FIG. 5(*b*)). Further, it is clear that the operating part 91 provided on the front sub-casing 83A is disposed farther upstream in the mounting direction (front side) than the inner protrusions 98 provided on the inner casing 82 of the rear sub-casing 83C.

As described above, when the receiving part 54 is in the first position, the second guide grooves 76 in the first position are linked to the respective first guide grooves 65 so as to extend diagonally upward and frontward in a single straight line. Therefore, after passing through the front second guide grooves 76A, the rear outer protrusions 90A slide through the first guide grooves 65 (are received and guided along the first guide grooves 65) and are ultimately received in the rear second guide grooves 76B, as shown in FIG. 5(*a*).

When the rear outer protrusions 90A are received in the rear second guide grooves 76B, the inner protrusions 98 have transferred through the front second guide grooves 76A and have been received in the first guide grooves 65, and the front outer protrusions 90B are positioned in the lower rear ends of the front second guide grooves 76A (i.e., have not passed into the first guide grooves 65).

In this way, the outer protrusions 90 and the inner protrusions 98 are guided by the linked sets of the first guide grooves 65 and the second guide grooves 76 as the toner cartridge 11 is mounted in the developing unit 16.

When the rear outer protrusions 90A are received in the rear second guide grooves 76B, the rear surface (and specifically the sealing members 78) of the rear sub-casing 83C constituting part of the outer casing 81 contacts the rear wall 72 of the receiving part 54 from the upper front side while the receiving part 54 is in the first position, as shown in FIG. 5(*b*). At this point, the toner cartridge 11 stops moving diagonally downward and rearward and is completely inserted in the receiving part 54.

In this state, the through holes 88 formed in the toner cartridge 11 are positioned opposite the through-holes 77 formed in receiving part 54 on the upper-front side thereof. More specifically, the supply hole 88A is in communication with the supply hole 77A, and the left and right recovery holes 88B are in communication with the respective left and right recovery holes 77B (see FIG. 6).

By subsequently pushing down on the operating part 91 of the toner cartridge 11, the receiving part 54 in which the toner cartridge 11 has been inserted rotates from the first position toward the second position shown in FIGS. 5(*c*) and 5(*d*).

When the receiving part 54 is rotated toward the second position, the first guide grooves 65, which were extended diagonally upward and frontward when the receiving part 54 was in the first position, remain in the same orientation, but the second guide grooves 76 that were in the first position now intersect the first guide grooves 65 when viewed along the width direction, as shown in FIG. 5(*c*). Therefore, the outer casing 81 having the outer protrusions 90, which have been received (fitted) in the second guide grooves 76, rotates clockwise in a left side view relative to the inner casing 82 having the inner protrusions 98, which have been received (fitted) in the first guide grooves 65. It could also be said that the inner casing 82 rotates counterclockwise in a left side view relative to the outer casing 81.

As the outer casing 81 rotates, the left and right distal parts 91A of the operating part 91 are inserted through the open tops of the notches 58, which are formed in the corresponding left wall 56 and right wall 57 of the main part 53 of the developing section 10, and slide down into the notches 58. The notches 58 are formed in a shape corresponding to the rotational path of the outer casing 81 (distal parts 91A).

When the receiving part 54 is rotated into the second position as shown in FIG. 5(*c*), the inner casing 82 is disposed in the open position by virtue of rotating relative to the outer casing 81, and the toner cartridge 11 is entirely accommodated in the main part 53 of the developing section 10, as shown in FIG. 5(*d*). Through the above operations, the procedure for mounting the toner cartridge 11 in the developing unit 16 (the developing section 10) is complete.

At this time, the inner protrusions 98 continue to remain in the first guide grooves 65. Of the outer protrusions 90, the front outer protrusions 90B continue to remain in the rear ends of the respective front second guide grooves 76A, while the rear outer protrusions 90A continue to remain in the rear second guide grooves 76B.

As shown in FIG. 5(*d*), the through-holes 88 formed in the toner cartridge 11 also remain in confrontation and in communication with the through-holes 77 formed in the receiving part 54, as when the receiving part 54 is in the first position. However, when the receiving part 54 is in the second position, the through-holes 88 are also in communication with the front side of the through-holes 63 via the through-holes 77, and thus are in communication with the interior of the developing part 41 (developing casing 43).

Hence, after the toner cartridge 11 is completely mounted in the developing unit 16, the through-holes 63 and the through-holes 77 on the developing section 10 side are aligned with the through-holes 88 and the through-holes 93 on the toner cartridge 11 side in the front-to-rear direction and in communication with the same.

More specifically, as shown in FIG. 6, the supply holes 63A, 77A, 88A, and 93A are in communication with one another; the left recovery holes 63B, 77B, 88B, and 93B are in communication with one another; and the right recovery holes 63B, 77B, 88B, and 93B are in communication with one another.

Also at this time, the left and right distal parts 91A of the operating part 91 are positioned in the bottom ends (deepest parts) of the respective notches 58 (see FIG. 5), and the front ends of the distal parts 91A are fitted from above into the corresponding left and right notches 35 formed in the front wall 24 of the drum section 8 (drum case 20). Hence, when viewed along the vertical direction, the front wall 61 of the main part 53 of the developing section 10 and the front wall 24 of the drum case 20 (the portion interposed between the left and right notches 35) are disposed inside the substantially U-shaped operating part 91 having the open to the "U" shape on the rear side.

Next, the procedure for removing the toner cartridge 11 from the developing unit 16 (the developing section 10) will be described. While the toner cartridge 11 is in the state shown in FIGS. 5(*c*) and 5(*d*), the operator grips the operating part 91 and lifts the operating part 91 upward so that the receiving part 54 rotates from the second position to the first position shown in FIGS. 5(*a*) and 5(*b*) and the inner casing 82 in the toner cartridge 11 rotates from the open position to the closed position. Next, the operator pulls the toner cartridge 11 diagonally upward and frontward. When the toner cartridge 11 comes completely out of the receiving part 54, the procedure for removing the toner cartridge 11 is complete. In this process, as the operator removes the toner cartridge 11 from the developing unit 16 (i.e., pulls the toner cartridge 11 diagonally upward and frontward from the receiving part 54 disposed in the first position of FIG. 5(*a*)), the outer protrusions 90 and the inner protrusions 98 are guided along the respective first guide grooves 65 and second guide grooves 76 that are aligned, as shown in FIG. 5(*a*).

In this way, the operations for mounting the toner cartridge 11 in and removing the toner cartridge 11 from the developing unit 16 (the process cartridge 3) by operating the operating part 91 are associated with the rotation of the inner casing 82 and, thus, opening and closing of the through-holes 88 with the inner casing 82.

Further, the outer protrusions 90 and the inner protrusions 98 disposed along the single line Z shown in FIGS. 3(*a*) and 3(*c*) are guided by the respective first guide grooves 65 and second guide grooves 76 when mounting the toner cartridge 11 in and removing the toner cartridge 11 from the developing unit 16. At this time, the inner protrusion 98 on each widthwise side is interposed between the corresponding rear outer protrusion 90A and front outer protrusion 90B along the direction in which the toner cartridge 11 is mounted in and removed from the developing unit 16 (the direction along a line connecting the front end and rear end of the toner cartridge 11 indicated by a bold arrow Y in FIG. 5(*a*)).

Next, the operations of the process cartridge 3 during image formation when the toner cartridge 11 is mounted in the developing unit 16 will be described.

During an image forming operation, the input units 127 of the main part 53 shown in FIG. 6 are in the input position (not shown in the drawing) described above. Specifically, pressing members (not shown) provided in the main casing 2 press the pressable parts 128 of the input units 127 leftward.

At this time, the left end 129A of the shaft part 129 in the front input unit 127A is fitted from the right side into the recessed part 100A of the input part 100 of the agitator 99 disposed in the front sub-casing 83A of the toner cartridge 11. Accordingly, the front input unit 127A is coupled with the input part 100. Also, the left end 129A of the shaft part 129 in the rear input unit 127B is fitted from the right side into the recessed part 100A of the input part 100 of the agitator 99 disposed in the inner casing 82 of the toner cartridge 11. Accordingly, the front input unit 127A is coupled with the input part 100.

In this condition, an output shaft of a drive source (not shown) disposed in the main casing 2 is fitted from the right side into the recess 128A of the front input unit 127A, so that driving force generated at the driving source is transmitted to the front input unit 127A, rotating the front input unit 127A.

The driving force transmitted to the front input unit 127A is input to the input part 100 of the agitator 99 disposed in the front sub-casing 83A, and transmitted to the agitator 99 in the front sub-casing 83A and subsequently to the agitator 99 in the middle sub-casing 83B via the gear 101 of the input part 100 and the gears 102 and 103.

The driving force transmitted to the front input unit 127A is also transmitted to the rear input unit 127B via the gear 117 on the first support shaft 111 and the gears 118, 119, 120, and 121, rotating the rear input unit 127B. The driving force transmitted to the rear input unit 127B is input to the input part 100 of the agitator 99 in the inner casing 82 and transmitted to the agitator 99 in the inner casing 82 and to the conveying auger 45 and the developing roller 9 via the gears 122, 123, and 124.

That is, the driving force transmitted to the front input unit 127A is transmitted to the input part 100 of the agitator 99 in the front sub-casing 83A, the input part 100 of the agitator 99 in the inner casing 82, the conveying auger 45, and the developing roller 9.

Here, the front input unit 127A receives the driving force from the driving source and inputs the same to the input part 100 of the agitator 99 in the front sub-casing 83A. On the other hand, the rear input unit 127B function as a transmitting mechanism that transmits part of the driving force received by the front input unit 127A to the input part 100 of the agitator 99 in the inner casing 82, the conveying auger 45, and the developing roller 9. This transmitting mechanism also includes the gears 117, 118, 119, 120, 121, 122, 123, and 124.

The driving force transmitted in the above-described manner rotates the agitator 99 in the front sub-casing 83A, the agitator 99 in the middle sub-casing 83B, the agitator 99 in the inner casing 82, the conveying auger 45, and the developing roller 9.

Each agitator 99 rotates in the clockwise direction as indicated by arrows in FIG. 1 in the left side view. When the agitator 99 rotates in the front sub-casing 83A, the blades 99C agitate toner in the front sub-casing 83A and scoop the toner in a direction diagonally upward and rearward to convey toner into the middle sub-casing 83B (see FIG. 1). The blades 99C of the agitator 99 rotating in the middle sub-casing 83B agitates toner conveyed into the middle sub-casing 83B and scoop the toner in a direction diagonally upward and rearward, thereby conveying the toner sequentially through the communication hole 85 and the intake 94 into the inner casing 82 (see FIG. 1).

As shown in FIG. 6, all blades 99C of the agitator 99 disposed in the inner casing 82, except for the blade 99C in the widthwise center thereof, have a distal edge (outer edge in a radial direction of the rotational shaft 99A) that slopes inward in the radial direction of the rotational shaft 99A toward the outer widthwise side. The blade 99C in the widthwise center of the agitator 99 disposed in the inner casing 82 has a distal edge that extends uniformly along the width direction (as do all blades 99C for the other agitators 99).

Hence, when the agitator 99 is rotating in the inner casing 82, the blades 99C having sloped edges agitate toner on the widthwise outer sides of the inner casing 82 and convey this toner inward in the width direction, i.e., toward the blade 99C in the widthwise center. The blade 99C in the widthwise center of the rotating agitator 99 agitates toner conveyed to the widthwise center as described above, while scooping the toner a direction diagonally upward and rearward. In this way, the center blade 99C conveys (supplies) toner sequentially through the supply holes 93A, 88A, 77A, and 63A into the developing casing 43 of the developing section 10 (see also FIG. 1).

Toner conveyed into the developing casing 43 is supplied to the approximate widthwise center of the conveying auger 45. The blades 45A of the conveying auger 45 are shaped so that they appear to be moving outward in the widthwise directions from the widthwise center of the conveying auger 45 as the conveying auger 45 rotates. Therefore, the blades 45A of the conveying auger 45 convey toner supplied to the widthwise center region thereof toward both widthwise outer ends. While the toner is conveyed toward the widthwise outer ends, a portion of the toner drops onto the peripheral surface of the supply roller 44 (see also FIG. 1). The supply roller 44 rotates and supplies toner dropped onto its outer peripheral surface to the developing roller 9. As described earlier, the thickness-regulating blade 46 regulates the toner carried on the peripheral surface of the developing roller 9 to a thin layer. As described earlier, the supply roller 44 may be driven to rotate by transmitting the same drive force to the developing roller 9 and the supply roller 44.

Toner conveyed by the conveying auger 45 to the outer widthwise ends thereof that does not fall onto the peripheral surface of the supply roller 44 passes sequentially through the recovery holes 63B, 77B, 88B, and 93B on the respective widthwise ends and is returned to (recovered in) the inner casing 82 of the toner cartridge 11. Toner returned to the inner casing 82 is once again conveyed toward the blade 99C in the widthwise center of the inner casing 82 and subsequently conveyed through the supply hole 93A into the developing casing 43. That is, the toner in the toner cartridge 11 circulates between the interior of the inner casing 82 and the interior of the developing casing 43, passing back and forth between the toner cartridge 11 and the developing unit 16 (the portion of the process cartridge 3 excluding the toner cartridge 11) via the through-holes 63, 77, 88, and 93, as indicated by the bold, dotted lines and arrows in FIG. 6.

By providing the sealing members 78 described above (indicated by bold lines in FIG. 5(*d*)) to seal gaps between the inner casing 82 and the rear sub-casing 83C, the toner cartridge 11 (the rear sub-casing 83C) and the rear wall 72 of the receiving part 54, and the rear wall 72 and the rear wall 60 of the main part 53, toner circulating between the inner casing 82 and the developing casing 43 will not leak from the through-holes 63, 77, 88, and 93. Further, the sealing member 52 described above (see FIG. 1) prevents toner from leaking beneath the developing roller 9 in the developing casing 43.

As shown in FIG. 6, the front ends of the distal parts 91A of the operating part 91 are fitted into the corresponding left and right notches 35 formed in the front wall 24 of the drum section 8 (the drum case 20) through the top openings therein. In this state, the outer widthwise ends (hereinafter referred to as receiving parts 91B) of the operating part 91 formed on the rear ends of the respective distal parts 91A are pushed rearward by the pressing members 37 provided on the rear ends of the coil springs 36 that are disposed on the same widthwise sides of the front wall 24. Hence, the receiving parts 91B receive an elastic force from the coil springs 36, which force urges the entire developing section 10 in which the toner cartridge 11 is mounted rearward.

As a result, a section of the outer peripheral surface (rear peripheral surface) of the developing roller 9 of the developing section 10 presses against the front peripheral surface of the photosensitive drum 6 of the drum section 8, so the toner on the outer peripheral surface of the developing roller 9 is effectively supplied to electrostatic latent images formed on the surface of the photosensitive drum 6.

When the distal parts 91A are fitted into the corresponding notches 35 as described above, the portion of the operating part 91 on the front side of the distal parts 91A is also in front of the front wall 24 of the drum section 8 and forms the front end of the process cartridge 3. Accordingly, an operator can grip the operating part 91 when mounting the process cartridge 3 in or removing the process cartridge 3 from the main casing 2, as described earlier.

Figure 7:
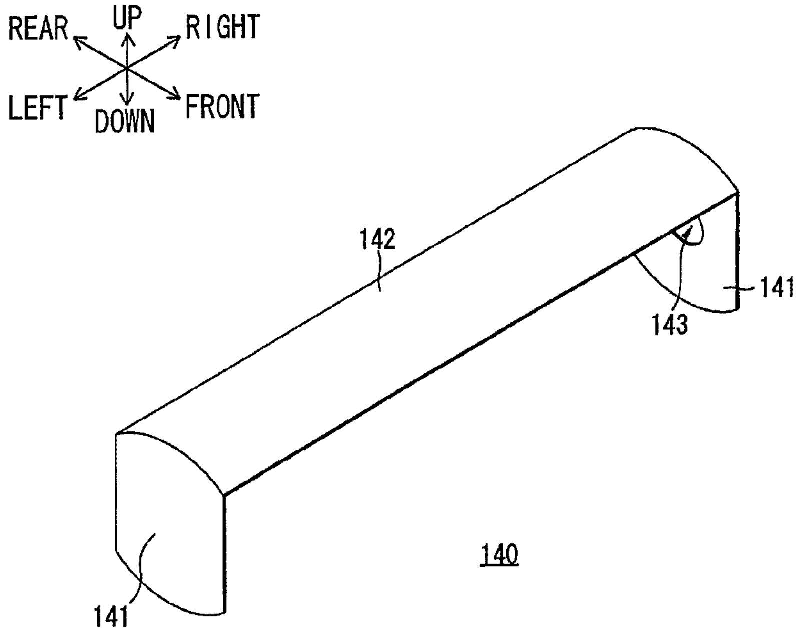
FIG. 7 is a perspective view of a retaining member from a point diagonally upward and leftward thereof.

The toner cartridge 11 includes a retaining member 140 shown in FIG. 7. The retaining member 140 is formed by bending a thin metal plate. When viewed along the front-to-rear direction, the retaining member 140 has a substantially inverted U-shape. The retaining member 140 is integrally provided with a pair of retaining plates 141 and a bridge plate 142. The retaining plates 141 are substantially rectangular when viewed along the width direction, elongated vertically, and disposed parallel to each other while separated in the width direction. The bridge plate 142 is elongated in the width direction and spans between the top edges of the retaining plates 141.

Figure 8A:
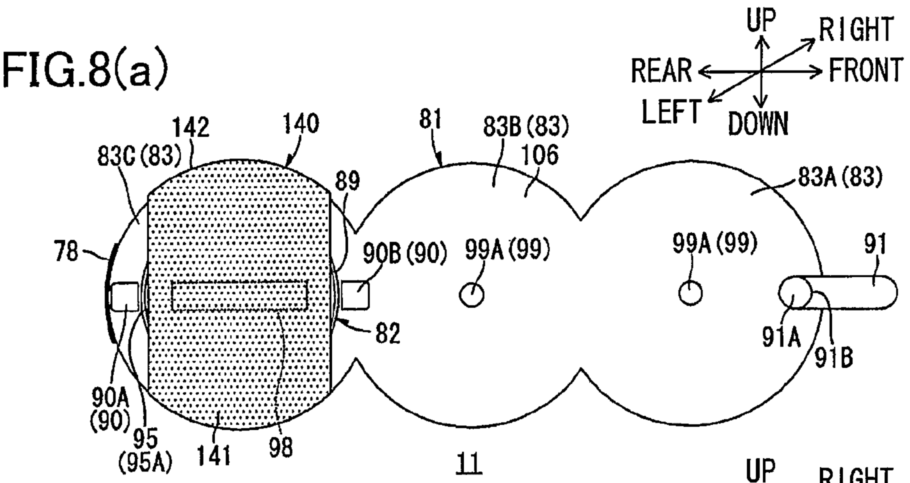
FIG. 8(*a*) is a left side view of the toner cartridge with the retaining member mounted thereon.
Figure 8B:
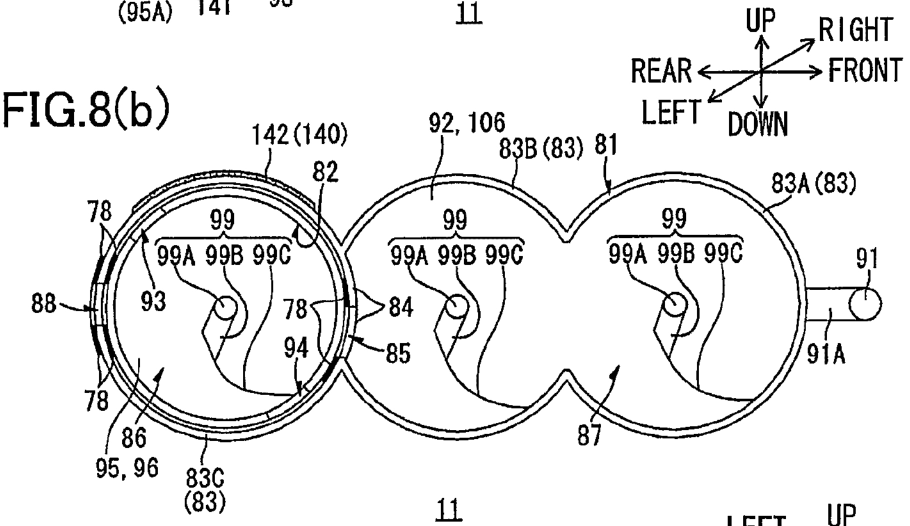
Figure 8C:
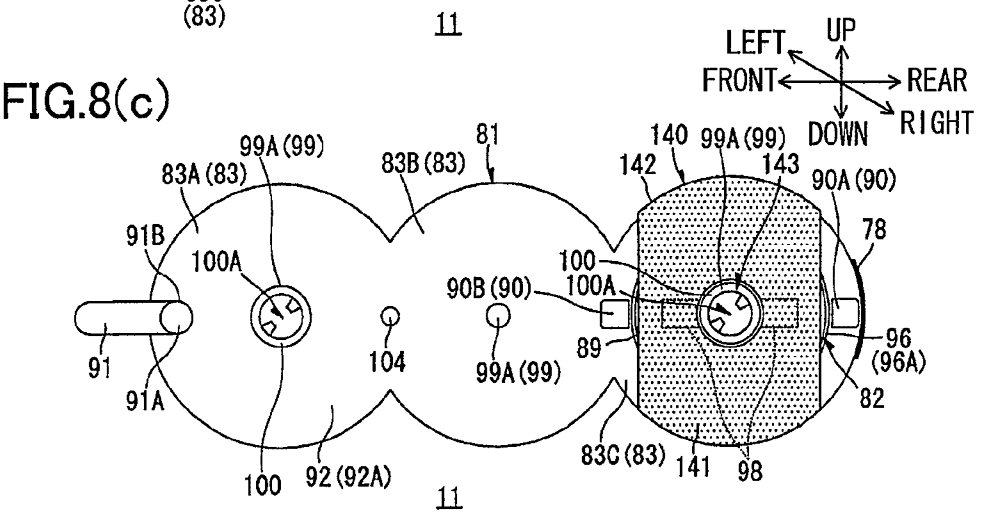

As shown in FIGS. 8(*a*) and 8(*b*), the top edges of the retaining plates 141 (the retaining plates 141 are shaded in FIGS. 8(*a*) and 8(*b*)) are formed in an arc shape that is convex on the top side, while the bottom edges are also arc-shaped and convex on the bottom side. The radius of curvature for both the top and bottom edges of each retaining plate 141 is identical to that for the peripheral surface of the rear sub-casing 83C. The vertical dimension of each retaining plate 141 at its largest point is slightly greater than the outer diameter of the rear sub-casing 83C. The front-to-rear dimension of the rear sub-casing 83C at its largest point is smaller than the distance between the front surface of the rear outer protrusion 90A and the rear surface of the front outer protrusion 90B.

Figure 10:
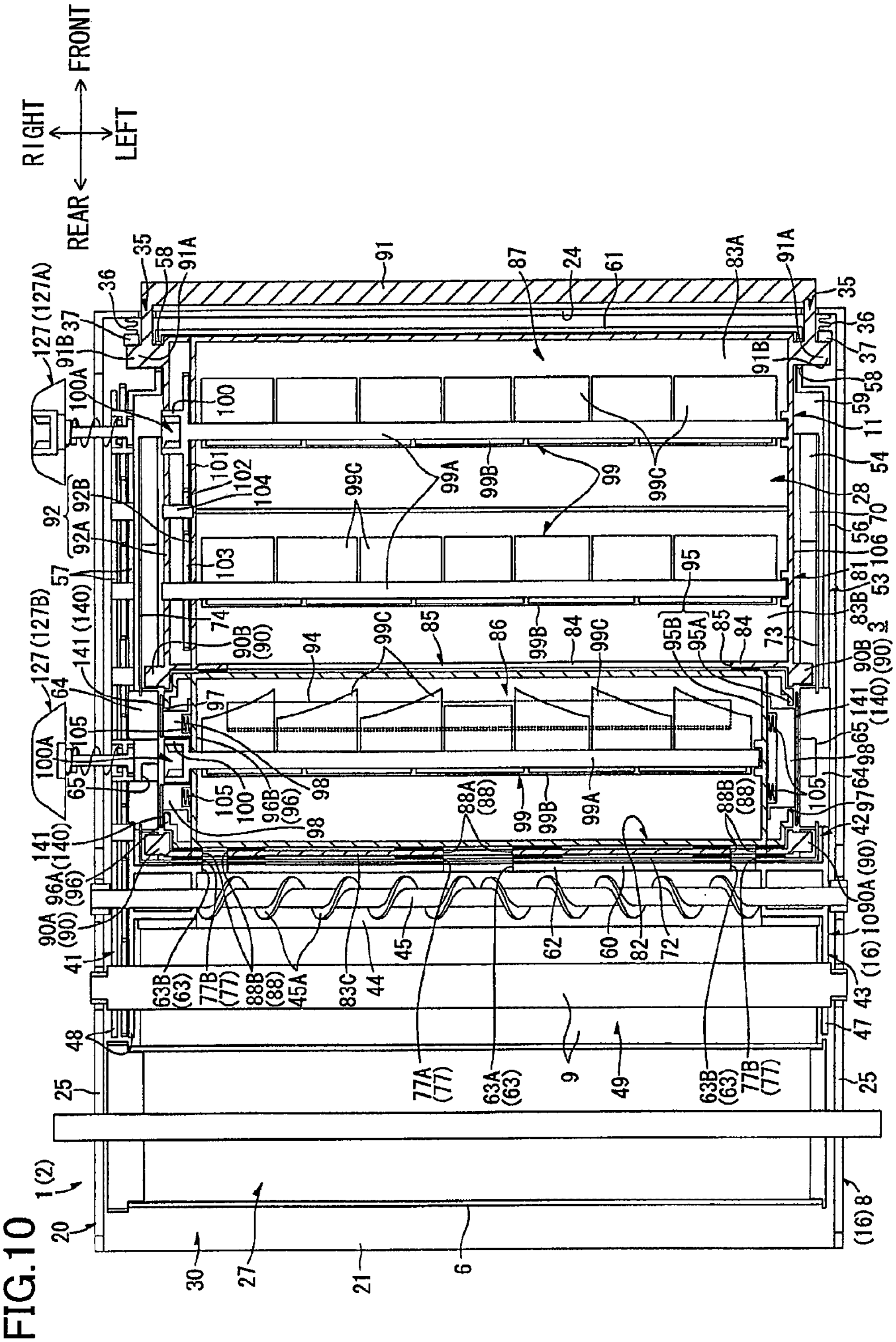
FIG. 10 is a cross-sectional plan view of the process cartridge taken along a line X-X of FIG. 9(*b*).

A distance between the retaining plates 141 is slightly greater than a distance between the left surface of the inner casing 82 of the toner cartridge 11 (the left surface of the outer wall 95A of the left wall 95) and the right surface thereof (the right surface of the outer wall 96A of the right wall 96), which is equal to a distance between the left and right surfaces of the rear sub-casing 83C (see FIG. 10).

A round hole 143 is formed in the right retaining plate 141 at a substantially widthwise center thereof so as to penetrate the right retaining plate 141 in the width direction, as shown in FIGS. 7 and 8(*c*).

As with the top edges of the retaining plates 141, the bridge plate 142 is also curved in an arc shape that is convex on the top when viewed along the width direction (see FIGS. 7 and 8(*b*)).

The retaining member 140 is used when shipping a newly manufactured printer 1. Specifically, the retaining member 140 is mounted on the outer casing 81 of a newly manufactured toner cartridge 11 for shipping. The retaining member 140 can be removed from the outer casing 81, as will be described below.

When mounting the retaining member 140 on the outer casing 81, the inner casing 82 is placed in the closed position, and the left and right inner protrusions 98 are both pressed inward in the width direction to the retracted position indicated by the dotted line in FIG. 4(*a*).

Next, the operator mounts the retaining member 140 on the outer casing 81 from above so that the pair of retaining plates 141 are positioned over the outer widthwise sides of the inner casing 82 and the rear sub-casing 83C.

When viewed along the width direction, the top edges of the retaining plates 141 and the bridge plate 142 are nearly flush with the upper peripheral edge of the rear sub-casing 83C at this time, while the bottom edges of the retaining plates 141 are nearly flush with the lower peripheral edge of the rear sub-casing 83C (see FIGS. 8(*a*) and 8(*c*)). As shown in FIG. 8(*a*), the left retaining plate 141 contacts the left surfaces of the inner casing 82 and the rear sub-casing 83C from the left side thereof. At the same time, the left retaining plate 141 presses rightward (inward in the width direction) on the left side of the left inner protrusion 98 in order to hold the left inner protrusion 98 in the retracted position (see FIG. 10). At this time, the left retaining plate 141 is interposed in the width direction between the rear outer protrusion 90A and the front outer protrusion 90B on the same widthwise side, but is out of contact with the same.

As shown in FIG. 8(*c*), the right retaining plate 141 contacts the right surfaces of the inner casing 82 and the rear sub-casing 83C from the left side thereof. At the same time, the right retaining plate 141 presses leftward (inward in the width direction) on the right side of the right inner protrusion 98 in order to hold the right inner protrusion 98 in the retracted position (see FIG. 10). At this time, the right retaining plate 141 is interposed in the width direction between the rear outer protrusion 90A and the front outer protrusion 90B on the same widthwise side, but is out of contact with the same. Also, the input part 100 of the agitator 99 in the inner casing 82 is exposed rightward through the round hole 143 formed in the right retaining plate 141.

Figure 9A:
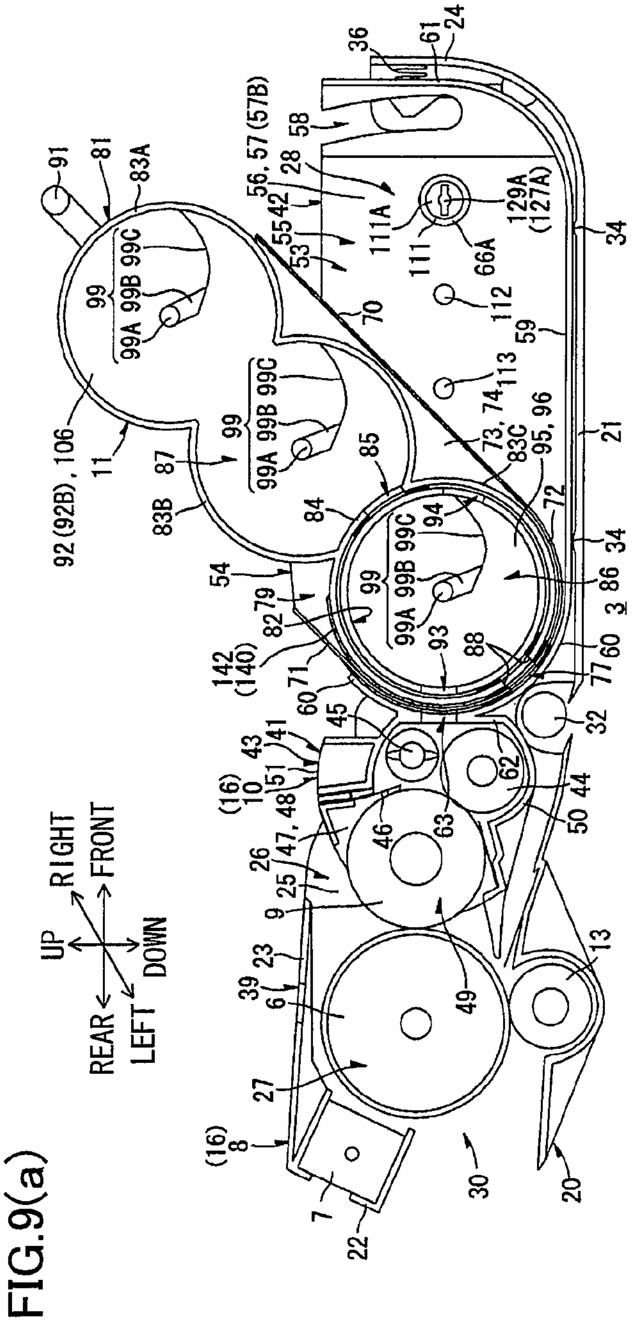
FIG. 9(*a*) is a cross-sectional left side view of the process cartridge with the receiving part at the first position.
Figure 9B:
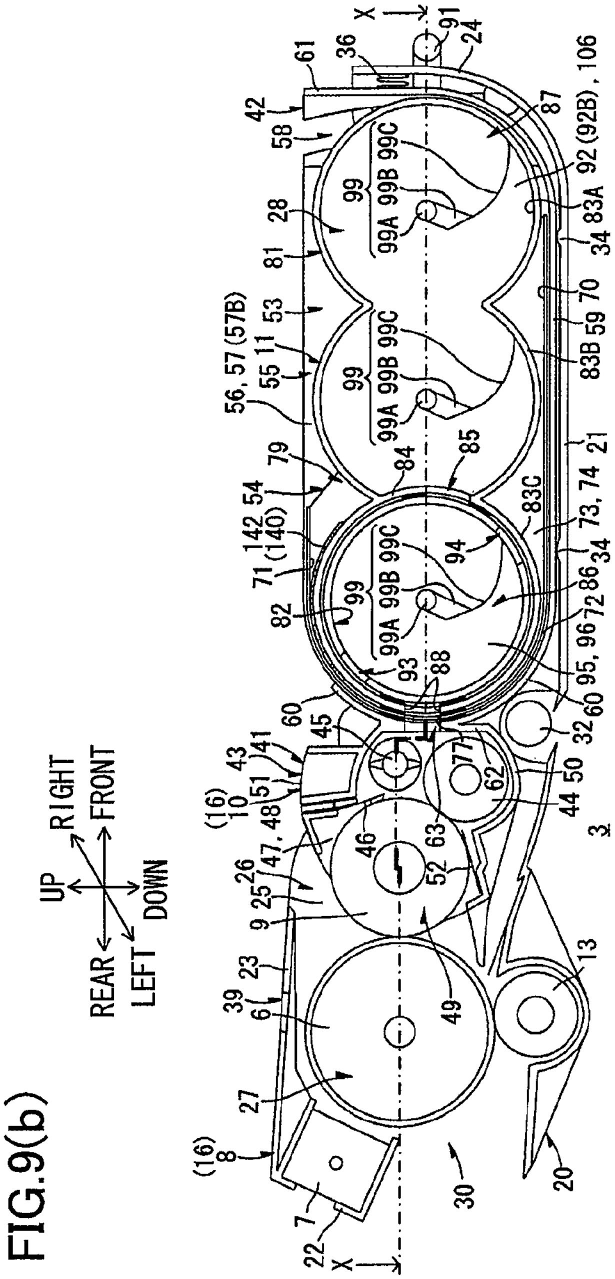

The toner cartridge 11 is mounted in the developing unit 16 (the developing section 10) after the retaining member 140 has been attached to the toner cartridge 11 as described above. As shown in FIG. 9(*a*), the toner cartridge 11 is mounted in the developing unit 16 according to the same procedure described earlier. Specifically, the receiving part 54 is set in the first position, after which the toner cartridge 11 is inserted into the receiving part 54 in a direction diagonally downward and rearward.

At this time, the outer protrusions 90 (FIGS. 8(*a*) and 8(*c*)) are fitted in and guided along the first guide grooves 65 and the second guide grooves 76 (FIG. 2(*c*)). However, each inner protrusion 98 held in the retracted position by the retaining member 140 is not received in any of the first and second guide grooves 65 and 76.

Thus, even when the receiving part 54 is rotated from the first position to the second position after the insertion of the toner cartridge 11 into the receiving part 54 completes, the inner casing 82 does not rotate with respect to the outer casing 81 as shown in FIG. 9(*b*) and is maintained at the closed position. That is, each inner protrusion 98 (FIGS. 8(*a*), 8(*c*), and 10) at the retracted position prevents the inner casing 82 from rotating relative to the outer casing 81 (prevents the outer casing 81 from opening or closing the through holes 88). As a result, the through holes 88 are maintained closed. This prevents the toner from leaking from the toner cartridge 11 through the through holes 88.

Once the toner cartridge 11 with the retaining member 140 attached thereto is mounted in the developing unit 16 and the developing unit 16 (process cartridge 3) is mounted (accommodated) in the main casing 2, the printer 1 is packaged for shipping.

A user who obtained the printer 1 first removes the process cartridge 3 from the main casing 2, and then removes the toner cartridge 11 from the developing unit 16. Then, the user removes the retaining member 140 from the outer casing 81 of the toner cartridge 11. As a result, each inner protrusion 98 of the toner cartridge 11 is moved to the advanced position by the urging force of the spring 105 as indicated by the solid line in FIG. 4(*a*).

Then, the toner cartridge 11 is mounted onto the developing unit 16. When inserting the toner cartridge 11 into the receiving part 54 in the first position, each inner protrusion 98 at the advanced position is received by (engaged with) the first and second guide grooves 65 and 76 in the manner described above (FIG. 5(*a*)). When the receiving part 54 is subsequently rotated from the first position to the second position as described above, the inner casing 82 inside the toner cartridge 11 is this time rotated from the closed position to the open position (FIGS. 5(*c*) and 5(*d*)). That is, each inner protrusion 98 at the advanced position allows the inner casing 82 to rotate to open or close the through holes 88. As a result, the through holes 88 are opened, allowing the toner to flow from the toner cartridge 11 into the developing section 10 and enabling execution of image forming operations.

As described above, the process cartridge 3 includes the toner cartridge 11 that is detachably mounted on the developing unit 16 as shown in FIGS. 5(*a*) to 5(*d*). Because the inner protrusions 98 of the toner cartridge 11 are received and guided by the first guide groove 65 and the second guide grooves 76 in continuation with the first guide groove 65 as shown in FIG. 5(*a*) in the course of attaching or detaching the toner cartridge 11 to or from the developing unit 16, the attachment or detachment of the toner cartridge 11 can be performed smoothly.

Also, when the toner cartridge 11 is accommodated in the toner cartridge 11 as shown in FIG. 5(*a*), the inner protrusions 98 are received in the first guide grooves 65 formed in the main part 53, and the outer casing 81 can pivot about and relative to the inner protrusions 98 as shown in FIG. 5(*c*).

Pivoting the outer casing 81 in this manner moves the second guide grooves 76 to the second position as shown in FIG. 5(*c*), disconnected from the first guide grooves 65. Thus, the inner protrusions 98 stay received in the first guide grooves 65 and thus are prevented from coming out of the first guide grooves 65. This stabilizes the posture of the toner cartridge 11 mounted on the developing unit 16 and prevents the toner cartridge 11 from accidentally coming out of the developing unit 16.

Also, the inner casing 82 formed with the inner protrusions 98 selectively opens and closes the supply hole 88A formed in the outer casing 81 of the toner cartridge 11, as shown in FIGS. 4(*a*) and 4(*b*), thereby preventing toner from leaking from the supply hole 88A.

Further, operations for mounting the toner cartridge 11 in and removing the toner cartridge 11 from the developing unit 16 (the process cartridge 3) by operating the operating part 91 are associated with opening and closing of the through-holes 88 with the inner casing 82 as shown in FIGS. 5(*b*) and 5(*d*). This enhances operability of the developing unit 16.

Moreover, because the toner can be circulated such that the toner supplied through the supply hole 88A is collected from the developing unit 16 back into the toner cartridge 11 through the recovery holes 88B formed in the outer casing 81 as shown in FIG. 6, toner can be prevented from accumulating, preventing the toner from deteriorating extremely.

As shown in FIG. 2(*c*), the first guide groove 65 is in the second guide groove 76 (between the front and rear second guide grooves 76A and 76B) when the second guide groove 76 is at the first position. Thus, as shown in FIG. 2(*a*), moving the second guide groove 76 to the second position reliably disconnects the second guide groove 76 from the first guide groove 65 at both sides of the first guide groove 65.

Because the outer protrusions 90 fixed to the outer casing 81 are also received and guided by the first and second guide grooves 65 and 76 in the course of attaching or detaching the toner cartridge 11, the attachment or detachment of the toner cartridge 11 can be performed smoothly.

Because the outer protrusions 90 are received by the second guide groove 76 formed in the movable receiving part 54 when the toner cartridge 11 is completely inserted to the developing unit 16 as shown in FIG. 5(*c*), the outer casing 81 of the toner cartridge 11 can reliably pivot about the inner protrusion 98 received by the first guide groove 65 formed in the main part 53 that is not movable.

Because the outer and inner protrusions 90 and 98 aligned in a line are guided by the first and second guide grooves 65 and 76 aligned in a line and continued with one another, as shown in FIG. 5(*a*), it is possible to prevent the inner casing 82 (inner protrusion 98) from accidentally rotating while the outer and inner protrusions 90 and 98 are guided by the first and second guide grooves 65 and 76 (in the course of attachment or detachment of the toner cartridge 11).

Because the first and second guide grooves 65 and 76 are grooves, and the outer and inner protrusions 90 and 98 are protrusions protruding from the outer surfaces of the outer casing 81, the outer and inner protrusions 90 and 98 can be guided using a simple configuration.

As shown in FIG. 5(*b*), the sub-casings 83 (the front sub-casing 83A, the middle sub-casing 83B, and the rear sub-casing 83C) of the outer casing 81 are aligned in a line along the mounting direction of the toner cartridge 11. This makes it possible to form the toner cartridge 11 slender. Also, a user can easily pivots the slender toner cartridge 11 about the side nearest the supply hole 88A thereof by gripping the side farthest from the supply hole 88A (the side nearest the front sub-casing 83A).

Because each of the sub-casings 83A, 83B, and 83C are formed in a column shape, the agitators 99 disposed therein can smoothly rotate within the sub-casings 83A, 83B, and 83C to agitate toner.

The input units 127 for inputting driving force to the input parts 100 are formed movable between the advanced positions and the retracted positions, and are kept at the retracted positions as shown in FIG. 6 when the toner cartridge 11 is attached to or detached from the developing unit 16. Thus, the input units 127 do not interfere with the attachment or detachment of the toner cartridge 11.

As described above, the operating part 91 of the outer casing 81 is located on the upstream side of the inner protrusions 98 in the mounting direction of the toner cartridge 11, and the operating part 91 has the receiving parts 91B which receive pressing force that presses the developing roller 9 to the photosensitive drum 6. That is, the developing roller 9 presses against the photosensitive drum 6 only after the attachment of the toner cartridge 11 to the developing unit 16 completes. This prevents the developing roller 9 from unnecessary pressing against the photosensitive drum 6 when the toner cartridge 11 is not mounted on the developing unit 16, thereby preventing degradation of the developing roller 9 and the photosensitive drum 6.

Because the receiving parts 91B are integrally formed with the operating part 91, it is unnecessary to provide the receiving parts 91B as separate members, reducing the number of components.

Because the outer and inner protrusions 90 and 98 are formed at both widthwise sides of the toner cartridge 11 as shown in FIGS. 5(*a*) and 5(*c*), the both widthwise sides of the toner cartridge 11 are guided by the first and second guide grooves 65 and 76, so the posture of the toner cartridge 11 is maintained stable during the attachment or detachment of the toner cartridge 11.

While the invention has been described in detail with reference to the embodiment thereof, it would be apparent to those skilled in the art that various changes and modifications may be made therein without departing from the spirit of the invention.

In the embodiment described above, the toner cartridge 11 is mounted in the process cartridge 3 and removed from the process cartridge 3 while the process cartridge 3 is separated from the main casing 2 (FIG. 1). However, the process cartridge 3 (the portion of the process cartridge 3 excluding the toner cartridge 11; i.e., the developing unit 16) may be integrally formed with the main casing 2, and the toner cartridge 11 may be detachably mounted in the main casing 2 (i.e., the process cartridge 3 of the main casing 2).

Further, while the developing section 10 of the developing unit 16 is mounted on the drum section 8 so as to be incapable of being detached therefrom in this embodiment described above, the developing section 10 may be detachably mounted on the drum section 8 instead.

In the embodiment described above, the retaining member 140 (FIG. 7) is formed of a thin metal plate shaped substantially like an inverted "U", but the material and shape of the retaining member 140 described above is merely one example. For example, the retaining member 140 may be configured of an annular band formed of rubber. In this case, the retaining member 140 is fitted around the rear sub-casing 83C of the toner cartridge 11 so that the rear sub-casing 83C is positioned inside the retaining member 140 in a front side view. With this configuration, the retaining member 140 attempts to contract due to the elasticity of the rubber and can thus hold the left and right inner protrusions 98 in the retracted position (FIG. 10).

What is claimed is:

1. An image forming apparatus comprising:
a main casing having an opening, and the main casing comprising a door for opening and closing the opening;
a process cartridge attachable to and detachable from the main casing through the opening in a front-rear direction when the door is opened, the process cartridge comprising:
a photosensitive drum rotatable about an axis extending in a right-left direction that is perpendicular to the front-rear direction; and
a developing roller;
a toner cartridge attachable to and detachable from the process cartridge, the toner cartridge comprising a toner casing storing toner to be supplied to the developing roller; and
a fuser configured to fix a toner image onto a sheet;
wherein, in a case where the process cartridge is attached to the main casing and the toner cartridge is attached to the process cartridge,
the photosensitive drum is arranged between the door and the fuser in the front-rear direction,
the developing roller is arranged between the door and the photosensitive drum in the front-rear direction, and
the toner cartridge is arranged between the developing roller and the door in the front-rear direction,
wherein, in a case where the toner cartridge is attached to the process cartridge, the toner cartridge is pivotable between a first position in which the toner cartridge is detachable from the process cartridge and a second position in which the toner cartridge is not detachable from the process cartridge, and
wherein, in a case where the toner cartridge is attached to the process cartridge and the toner cartridge is in the first position, the toner cartridge is detachable from the process cartridge in a detachment direction that is perpendicular to the right-left direction and that crosses the front-rear direction.

2. The image forming apparatus according to claim 1,
wherein the process cartridge comprises a guide member, and
wherein, in the case where the toner cartridge is attached to the process cartridge and the toner cartridge is in the first position, the guide member extends in the detachment direction.

3. The image forming apparatus according to claim 2,
wherein the guide member is pivotable between a first attitude in which the guide member extends in the detachment direction and a second attitude in which the guide member extends in the front-rear direction.

4. The image forming apparatus according to claim 2,
wherein, in a case where the toner cartridge is attached to the process cartridge and the toner cartridge is in the second position, the process cartridge is attachable to and detachable from the main casing through the opening in the front-rear direction.

5. The image forming apparatus according to claim 2,
wherein the toner cartridge further comprises a guided member configured to be guided by the guide member of the process cartridge for attachment and detachment of the toner cartridge to and from the process cartridge, and
wherein the toner cartridge further comprises a sub-toner casing configured to communicate with the toner casing, and the guided member is arranged on the sub-toner casing.

6. The image forming apparatus according to claim 1,
wherein the toner cartridge further comprises a sub-toner casing configured to communicate with the toner casing, and
wherein, in a case where the toner cartridge is attached to the process cartridge and the toner cartridge pivots between the first position and the second position, the toner casing is pivotable about the sub-toner casing.

7. The image forming apparatus according to claim 1,
wherein the toner cartridge further comprises a sub-toner casing configured to communicate with the toner casing,
wherein, in the case where the toner cartridge is attached to the process cartridge and the toner cartridge is in the first position, the toner casing and the sub-toner casing are aligned in the detachment direction, and
wherein, in a case where the toner cartridge is attached to the process cartridge and the toner cartridge is in the second position, the toner casing and the sub-toner casing are aligned in the front-rear direction.

8. A process cartridge detachably attachable to a main casing of an image forming apparatus, the process cartridge comprising:
a photosensitive drum rotatable about a drum axis;
a developing roller configured to supply toner to the photosensitive drum; and
a cartridge accommodating part to which a toner cartridge storing the toner is detachably attachable,
the cartridge accommodating part comprising:
a receiving part configured to detachably receive the toner cartridge; and
a main part supporting the receiving part,
the receiving part having a first side wall and a second side wall opposing each other, each of the first side wall and the second side wall having a respective guide groove configured to guide the toner cartridge such that the toner cartridge is movable in a first direction crossing the drum axis for attachment and detachment of the toner cartridge to and from the cartridge accommodating part, each of the guide grooves being pivotable about an axis parallel to the drum axis relative to the main part.

9. The process cartridge according to claim 8,
wherein the toner cartridge comprises a first casing defining a first chamber therein, the first casing having a supply hole for allowing the toner to pass therethrough toward the developing roller, and
wherein, in a case where the toner cartridge is attached to the cartridge accommodating part, the toner cartridge is pivotable between a first position where the toner cartridge is not detachable from the cartridge accommodating part and a second position where the toner cartridge is detachable from the cartridge accommodating part.

10. The process cartridge according to claim 9, wherein the main part includes a rear wall, and a front wall spaced apart from the rear wall in the first direction.

11. The process cartridge according to claim 10, wherein the main part has an exposure opening positioned between the front wall and the rear wall in the first direction, and wherein the toner cartridge is pivotable between the first position and the second position through the exposure opening.

12. The process cartridge according to claim 9, wherein the toner cartridge further comprises a second casing defining therein a second chamber configured to communicate with the first chamber of the first casing, and wherein the first casing and the second casing are arranged in the first direction when the toner cartridge is in the first position.

13. The process cartridge according to claim 9, further comprising a developing casing accommodating the developing roller, the developing casing having an opening, wherein, when the toner cartridge is in the first position, the supply hole of the toner cartridge and the opening of the developing casing face each other, and wherein, when the toner cartridge is in the second position, the supply hole of the toner cartridge is offset from the opening of the developing casing.

14. The process cartridge according to claim 9, wherein the toner cartridge comprises:

a first agitator disposed in the first chamber of the first casing, and wherein the toner cartridge is pivotable about an axis of the first agitator between the first position and the second position relative to the cartridge accommodating part.

15. The process cartridge according to claim 9, wherein the first casing is cylindrical in shape.

* * * * *